(12) United States Patent
Truong et al.

(10) Patent No.: US 8,989,815 B2
(45) Date of Patent: Mar. 24, 2015

(54) FAR FIELD NOISE SUPPRESSION FOR TELEPHONY DEVICES

(71) Applicant: Polycom, Inc., San Jose, CA (US)

(72) Inventors: Kwan K. Truong, Alpharetta, GA (US); Peter Chu, Lexington, MA (US); Steve Potts, Andover, MA (US); Erwin Goesnar, Daly City, CA (US)

(73) Assignee: Polycom, Inc., San Jose, CA (US)

( * ) Notice: Subject to any disclaimer, the term of this patent is extended or adjusted under 35 U.S.C. 154(b) by 95 days.

(21) Appl. No.: 13/684,526

(22) Filed: Nov. 24, 2012

(65) Prior Publication Data
US 2014/0148224 A1    May 29, 2014

(51) Int. Cl.
*H04M 1/00* (2006.01)
*H04B 1/38* (2006.01)
*H04M 9/08* (2006.01)

(52) U.S. Cl.
CPC ................................ *H04M 9/085* (2013.01)
USPC ......... 455/557; 455/63.1; 455/67.13; 381/92; 381/94.1

(58) Field of Classification Search
CPC .................................................... H04M 9/08
USPC ............ 455/63.1, 67.13, 114.2, 557; 381/92, 381/94.1
See application file for complete search history.

(56) References Cited

U.S. PATENT DOCUMENTS 7,706,549 B2 *   4/2010   Zhang et al. .................... 381/92
8,155,364 B2 *   4/2012   An et al. ........................ 381/357

* cited by examiner

*Primary Examiner* — Tuan H Nguyen
(74) *Attorney, Agent, or Firm* — Wong, Cabello, Lutsch, Rutherford & Brucculeri, L.L.P.

(57) ABSTRACT

Noise suppression systems and methods suppress far field noise in a microphone signal. A telephony system includes a main microphone and a reference microphone. In one example, the main microphone and the reference microphone can be located in the same device. In another example, the main microphone and the reference microphone can be located in two separate devices. A DSP can use the reference microphone signal to carry out suppression of far field noise in the main microphone signal. In one approach the DSP can determine an estimate of far field noise in the main microphone signal based on a noise estimate of the reference microphone signal and a reference and main microphone coupling estimate, and then subtract the far field noise estimate from the main microphone signal. Alternatively, the DSP can suppress the main microphone signal if it determines that a local talker is inactive.

34 Claims, 15 Drawing Sheets

FAR FIELD NOISE SUPPRESSION FOR TELEPHONY DEVICES

FIELD OF THE INVENTION

The present invention relates generally to telephony devices and particularly to suppressing far field noise in telephony devices.

BACKGROUND

Telephones and conference units are commonly used for providing communication to near end and far end participants. These telephony devices include at least one microphone to capture the voice of the near end participants. Examples of such a microphone can be the microphone on a handset of a desktop telephone. In noisy environments, the microphone would pick up far field noise signals in addition to the voice signal, both of which signals get transmitted to the far end. This results in noisy voice signals being heard at the far end speaker. To overcome the noise signal, the near end speaker would have to speak louder so that the far end can hear his/her voice clearly over the noise signal. Clearly, this is inconvenient for the speaker. Furthermore, if the level of noise varies during the call, the speaker's voice may appear too loud or too low at the far end. Thus, the listening experience of far end listeners may be unsatisfactory.

One traditional solution to solving the problem of noise is to use a microphone array in a beamforming configuration. The microphones in the microphone array are arranged with a fixed distance between them. A signal processor coupled to the microphone array aims the audio beamforming in the direction of a speaker, providing directional sensitivity. As a result, sound from the speaker is emphasized, while noise from other directions surrounding the user is de-emphasized. Thus, the signal to noise ratio of the audio signal sent to the far end is improved.

In another solution, a reference microphone is used to capture stationary noise, which is then subtracted from the main microphone signal. Stationary noise is typically sensed over a long period of time (e.g., 1-2 s) by averaging the ambient noise signal generated by the reference microphone. The stationary noise signal is then subtracted from the main microphone signal using digital processing techniques.

The above mentioned techniques are used in several telephony applications for suppressing noise. One such application is a wireless headset, which, for example, uses a Bluetooth link to communicate with a communication device to provide hands free operation to the user. The wireless headset typically includes a microphone and a speaker that can be placed in close proximity with the user's mouth and ear respectively. The wireless headset can be affixed on or around an ear of the user so that the speaker is placed near the ear and the microphone extends to be close to the mouth. The wireless headset collects user's voice with the microphone and wirelessly transmits the voice signal to the communication device, which, in turn, transmits the voice signal to the far end. Furthermore, the communication device receives voice signals from the far end and wirelessly transmits the far end voice signals to the headset, which, in turn, reproduces the voice signal from the speaker.

The wireless headset can include one or more additional microphones to provide noise suppression using beamforming or stationary noise subtraction techniques described above. The noise suppression can be carried out at the headset itself or at the communication device. The additional microphone is typically permanently affixed to the headset, and therefore at a fixed distance from the headset microphone.

However, the inventors recognize a few drawbacks with the above techniques. Beamforming technique is less effective when the number of microphones in the microphone array is reduced. Because of cost and space considerations, mobile phones and wireless handsets can include only a small number of microphones—typically only two. As a result, the directionality of beamforming suffers by including a larger angle of sound sources. Consequently, the speaker's voice signal in addition to other sound source, many of them unwanted, located around the speaker are picked up by the microphones and sent to the far end.

Stationary noise cancellation techniques capture sound sources that are relatively constant over a large period of time. For example, sounds made by fans, machines, etc., which are repetitive can be effectively captured and subtracted using stationary noise sensing techniques. However, instantaneous noise, such as random ambient noise, people talking at a distance, background music, keyboard typing noise, etc. cannot be captured by stationary noise cancellation techniques. In some instances, the duration for which the reference microphone captures sound is reduced to allow capturing near instantaneous noise sources. However, even these techniques fail because the reference microphone signals, while including sounds from noise sources, also include the speaker's voice. Thus, when the reference microphone signals are subtracted from the main microphone signal, the subtraction can also remove some of the voice signal. Clearly, removing the signal of interest from the main microphone signal is undesirable.

The following disclosure addresses these and other drawbacks with noise cancellation and suppression in telephony devices.

SUMMARY

Noise suppression systems and methods presented herein suppress far field noise in a microphone signal. A near end communication system can include a main microphone for generating a main microphone signal. The main microphone signal can include voice of near end participants in addition to far field noise at the near end. The communication system can also include a reference microphone for generating a reference microphone signal. The reference microphone signal can be used for determining an estimate of the far field noise present in the main microphone signal or can be used to detect whether a local participant is currently talking. Telephony devices can include desktop telephones, conference units, mobile phones, etc.

In one example, the main microphone and the reference microphone can be located on the same device. Alternatively, the main microphone and the reference microphone can be located on separate devices connected by a communication link. For example, the main microphone can be located on a main device and the reference microphone can be located on a reference device. If the main device communicates with the far end, then the reference microphone signal can be transmitted over the communication link to the main device, where a processor (e.g., digital signal processor or DSP) can carry out noise suppression of the main microphone signal using the received reference microphone signal. Conversely, if the reference device communicates with the far end, then the main microphone signal can be transmitted over the communication link to the reference device, where the processor can carry out noise suppression of the received main microphone signal using the reference microphone signal. In both scenarios, the processor can insert time delays in the main microphone signal and/or the reference microphone signal such that their respective audio frames are time aligned.

In another example, the processor can choose to send the main microphone signal to a far end without noise suppression, if it determines that a latency of the main microphone signal due to inserted delays and/or noise suppression exceeds a predetermined limit. However, the processor can momentarily resume sending noise suppressed main microphone signals to the far end, despite high latency, during durations when the speaker at the near end is detected be in a state of monologue.

The DSP splits the main and reference microphone signals into subbands. In one approach, for each subband, the DSP determines a reference noise estimate of far field noise in the reference microphone signal. The DSP also determines a coupling estimate between the main and reference microphone signals. The DSP then determines an estimate of far field noise in the main microphone signal based on the reference noise estimate and the coupling estimate. The DSP then subtracts the far field noise estimate from the main microphone signal to produce a far field noise suppressed main microphone signal.

In another approach, for each subband, the DSP compares the levels of the main and reference microphone signal to determine whether a local participant is talking. If the local participant is detected not to be talking, the DSP can mute the main microphone signal, effectively suppressing any far field noise captured by the main microphone signal from being transmitted to the far end. When a local participant is detected to be talking, the DSP un-mutes the main microphone and allows the main microphone signal to be transmitted to the far end.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 1:
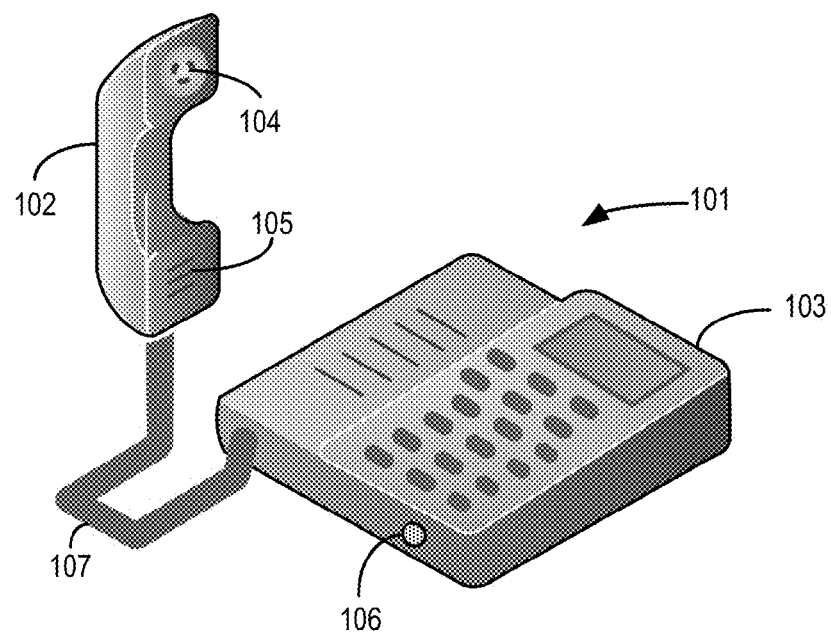
FIG. 1 shows an exemplary desktop telephone device having a handset microphone and a hands-free microphone, either of which can be used as a main microphone and a reference microphone.

FIG. 1 discloses an exemplary device for carrying out noise cancellation. Desktop telephone 101 includes a base station 103 and a handset 102 interconnected by a cord 107. Telephone 101 can be used by a near end user to communicate with one or more far end users. Telephone 101 can be a PSTN, VoIP, video phone, etc. Examples of telephone 101 can include products such as POLYCOM® SoundPoint® series, POLYCOM® VVX® series, etc. Telephone 101 can also include a hands-free microphone 106, which is typically used by the user during hands-free operation. In hands-free operation, the user can replace the handset 102 on the base station 103 without disconnecting the call. While in hands-free operation, the telephone 101 can capture the users voice using the hands-free microphone 106 and reproduce the far end's audio signal via a speaker (not shown) on the base station.

In one embodiment, the telephone 101 can use the hands-free microphone 106 as a reference microphone while using the handset microphone 105 on the handset 102 as the main microphone. The main microphone 105 captures the near end audio signal, which includes the voice signal of the user in addition to the far field noise signal of the environment. Note that far field noise can be any noise generated at a distance of at least 6 inches from the main microphone. The reference microphone 105 is used to capture a reference signal, which, in turn, is used to suppress the far field noise signal in the near end audio signal captured by the main microphone 105. After suppression, the near end audio signal is transmitted to the far end by the telephone 101.

One advantage offered by the telephone 101 in noise suppression is that it does not require affixing additional microphones, such as the microphone array used in beamforming, to enable noise suppression. Instead, the telephone 101 uses the existing hands-free microphone 105 as a reference microphone. As a result, costs associated with adding additional reference microphones and the accompanying circuitry is avoided.

In another embodiment, the main microphone and the reference microphone can dynamically reverse roles. For example, referring to FIG. 1, the hands-free microphone 106, which was previously acting as the reference microphone, can perform as a main microphone. Similarly, the handset microphone 105, which was previously acting as the main microphone, can perform the function of the reference microphone. Which one of the two microphones performs what role can be based on, for example, the mode of operation of the telephone 101, the relative distance of the microphones from the speaker, etc.

One can envision a scenario in which the telephone 101 is operating in the hands-free mode, i.e., the hands-free microphone 106 is being used to capture the user's voice. In such a scenario, the hands-free microphone 106 can be used as the main microphone, while the handset microphone 105 (whether on or off the cradle) can be used as the reference microphone.

In another scenario, while the telephone is operating in the hands-free mode, the user may move relative to the telephone 101 while talking. The user's motion may result in the handset microphone 105 being closer to the user than the hands-free microphone 106 during one time period but may also result in the opposite where the hands-free microphone 106 is closer to the user than the handset microphone. As will be discussed in detail below, it is advantageous to use the microphone that is closer to the user as the main microphone and user the other as the reference microphone. A measure of relative strength of the user's voice signal within the individual microphone signals can provide an indication of the user being closer to one of the two microphones. The telephone 101 can monitor the relative strength of the user's voice signal in signals received from both the hands-free microphone 106 and the handset microphone 105. The microphone with the higher strength of user's voice signal can be selected as the main microphone signal, while the other can be selected as the reference microphone signal.

Figure 2:
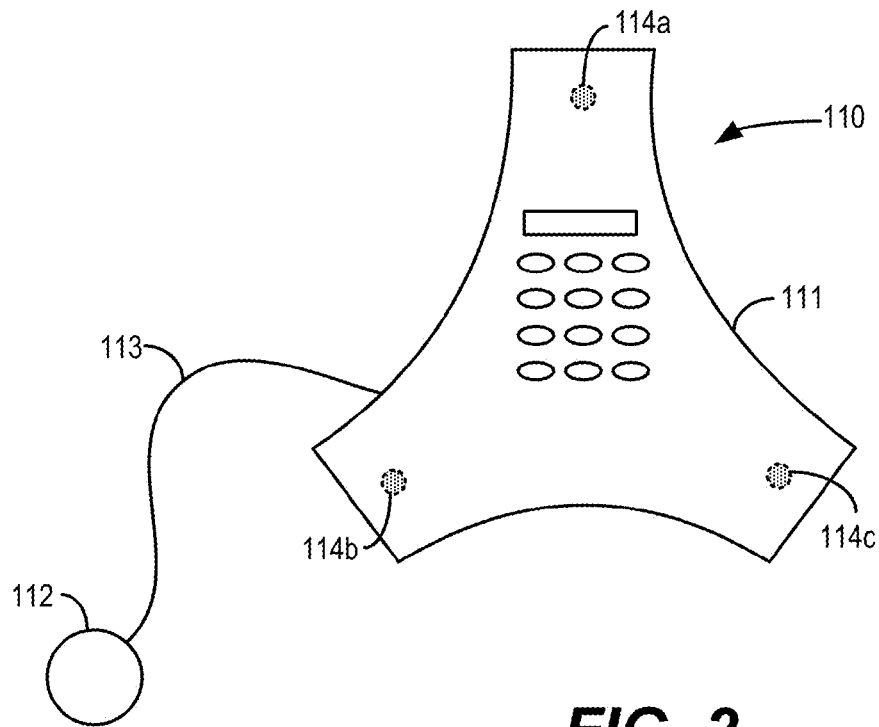
FIG. 2 shows an exemplary conference unit having base-unit microphones and an extension microphone, either of which can be used as a main microphone and a reference microphone.

FIG. 2 shows a conference unit 110 typically used for audio conference calls. The conference unit 110 includes a base station 111 and an extension microphone 112 connected to the base station 111 via cord 113. Examples of conference unit 110 can include products such as POLYCOM® SoundStation® series, POLYCOM® VoiceStation® series, etc. Typically, the base station 111 is placed at the center of a conference table, and the extension microphone 112 is extended to a position that is close to a speaker. Audio signals generated by the extension microphone 112 are transmitted to the base station via cord 113. The base station 111 also includes a base microphones 114a-c, which are typically used as an additional source of audio signal. However, for noise suppression, the conference unit 111 can use the extension microphone 112 as the main microphone for capturing the audio signal of the near end, and use any one of the base microphones 114a-c as a reference microphone for capturing a reference microphone signal. The reference microphone signal is used to suppress noise in the audio signal captured by the main microphone 111.

Similar to the telephone 101, conference unit 110 does not require affixing a microphone array to enable noise suppression. Instead, existing microphones that are typically used in normal operations are adapted as main and reference microphones. Here too, additional costs associated with microphone arrays are avoided.

Also similar to the telephone 101 of FIG. 1, the conference unit 110 can dynamically reverse the roles of the microphones from being the reference microphone to being the main microphone. For example, if user movement causes the user to be closer to one of the base microphones 114a-c than to the extension microphone 112, then the conference unit 110 can switch to using one of the base microphones 114a-c as the main microphone and using the extension microphone 112 as the reference microphone. In some instances, one of the base microphones 114a-c could be used as the main microphone while another one of the base microphones 114a-c could be used as the reference microphone.

Another advantage offered by both the telephone 101 and the conference unit 110 is that the distance between the main microphone (105/112) and the reference microphone (106/114) is not fixed. This allows positioning the main microphone closer to the speaker than the reference microphone. With this arrangement, the proportion of voice signal in the audio signal captured by the reference microphone is much less than that in the audio signal captured by the main microphone. As will be discussed further below, this aspect allows the reference microphone to be able to cancel out the noise signal from the main microphone signal more effectively, without affecting the voice signal, and to allow the detection of active or inactive local talker. As an example, the reference microphone can be placed at a distance of at least four inches away from where the main microphone is located. In another example, the reference microphone can be placed at a distance that produces a reference microphone signal of at least 6 dB less than the main microphone signal when the local participant is talking. However, the reference microphone may not be placed so far away from the main microphone, that the far field noise captured by the reference microphone is no longer representative of the far field noise present in the main microphone signal. As such, the reference microphone signal may not be able to provide an adequate estimate of the noise in the main microphone signal. As one can imagine, using such a reference microphone signal my result in inadequate noise suppression or at worst may result in undesirable noise being added to the main microphone signal. As an example, reference microphone can be placed at no more than four-six feet from the main microphone.

Figure 3:
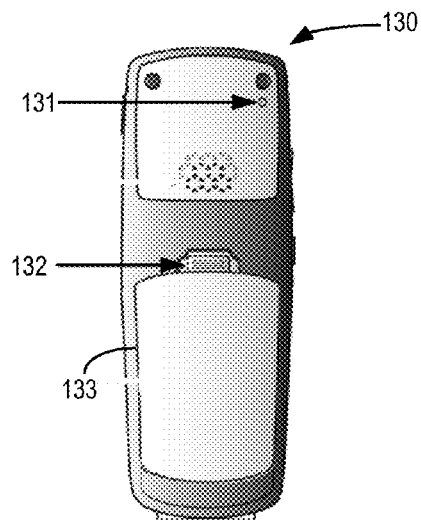
FIG. 3 shows an exemplary mobile telephone handset device having a main microphone and a reference microphone.

In yet another example, FIG. 3 shows the back side of an exemplary mobile phone or a wireless handset 130. Handset 130 includes a reference microphone 131 that is used for far field noise suppression and a battery pack 133 removably affixed to the handset 130 by a battery hatch 132. Handset 130 also includes a main microphone (not shown) for capturing the signal of interest, e.g., voice signal of the speaker, and is typically located at the bottom of the front side. Note that the location of the reference microphone 131 as shown in FIG. 3 is only exemplary. The reference microphone 131 can be located anywhere on the handset 130. In one example, the reference microphone 131 can be located as far as possible from the main microphone. The reference microphone signal can be used to estimate the far field noise present in the main microphone signal. Using this estimate, the far field noise in the main microphone signal can be suppressed. Note that while the prior art method of stationary noise suppression also subtracts an estimate of noise from the main microphone, it does so by measuring noise over a long period of time (e.g., 1-2 seconds). In contrast, the noise suppression methods (described in detail further below) used in the handset 130 carry out noise suppression in a near instantaneous fashion by suppressing noise every audio frame. As a result, short duration noise events and non-stationary noise, which would not be suppressed using stationary noise suppression method, would be advantageously suppressed using the noise suppression methods employed in handset 130.

Figure 4:
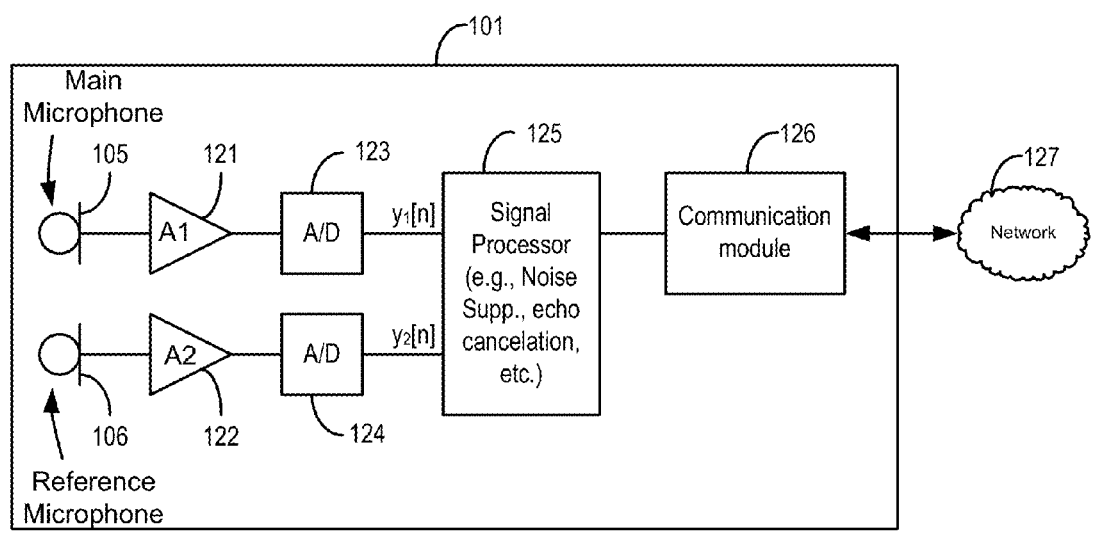
FIG. 4 depicts an exemplary block diagram of a communication device for suppressing far field noise.

Discussion now turns to the description of exemplary functional block diagrams of noise suppression in telephone 101, as shown in FIG. 4 (similar block diagram can represent conference unit 110 of FIG. 2, and the handset of FIG. 3). For simplicity, only those portions of telephone 101 that are relevant to noise suppression are disclosed in FIG. 4. Audio signals from both the main microphone 105 and the reference microphone 106 are amplified by amplifiers A1 121 and A2 122, respectively. The audio signal generated by the main microphone 105 includes the voice signal of the speaker in addition to far field noise signal. The reference microphone signal 106 also includes the voice signal and the far field noise signal; however, the proportion of voice signal is much smaller than that in the audio signal of the main microphone 105. As was described previously, the microphones 105 and 106 may also reverse roles, such that microphone 105, which is currently shown as the main microphone, can assume the role of the reference microphone and the microphone 106, which is currently shown as the reference microphone can assume the role of the main microphone.

Once amplified, the audio signals are sampled and digitized and fed to the digital signal processor (DSP) 125. The audio signals are typically sampled at a given sampling rate and a given frame rate. For example, the audio signals may be sampled at a rate of 48 Ksamples/s with a frame rate of 10 ms. DSP 125 can be a microcontroller, a microprocessor, an application specific integrated circuit, a field programmable gate array, or a combination of one or more of the above. The DSP 125 can also include volatile memory such as RAM, and can be coupled to non-volatile memory such as Flash memory, ROM, etc. The DSP 125 can be configured to carry out operations such as noise suppression (explained in detail below), echo cancellation, filtering, mixing, amplification, encoding, decoding, compression, decompression, etc. One of the outputs of the DSP 125 can be a noise suppressed main microphone signal $s_1[n]$.

The noise suppressed main microphone signal $s_1[n]$ can be outputted to a communication module 126, which can transmit the signal to the far end via network 127. The communication module 127 can include sub-modules for digital to analog conversion, amplification, modulation, network interfacing, etc. The communication module 126 can also receive communication signals such as far end microphone signals. Accordingly, the communication module 126 can additionally include sub modules for analog to digital conversion, demodulation, etc. that may be required for receiving such far end signals.

While the examples of FIGS. 1-3 showed the main microphone and the reference microphone located on the same device, the following examples illustrate scenarios in which the main microphone and the reference microphone can be located on separate devices.

Figure 5:
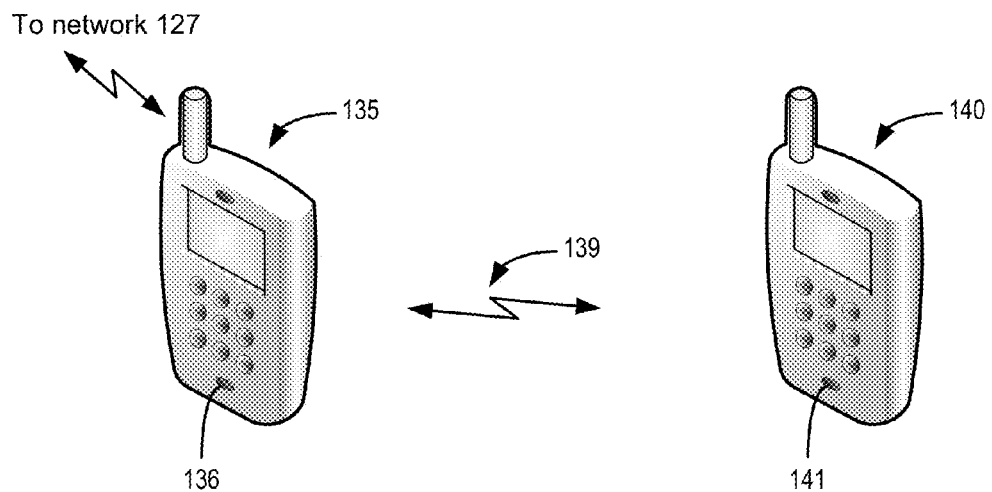
FIG. 5 shows an example in which the main microphone and the reference microphone are located in separate devices, and in which the reference microphone is transmitted from one device to the other device over a communication link.

FIG. 5 shows an example in which the main microphone is located on main device 135 and the reference microphone is located on a separate reference device 140. Main device 135 can be any telecommunication device that can transmit near end audio signals to a far end. For example, main device 135 can be a radio transceiver, a cellular phone, a wireless phone, smartphone, a personal digital assistant, etc. Reference device 140 can be any device that can capture sound through a microphone and can transmit the captured sound to the main device 135. As an example, reference device 140 can also be a telecommunication device similar to main device 135. Reference device 140 and main device 135 can communicate over a communication link 139. Preferably, the communication link 139 can be a wireless link such as a radio frequency (RF) link, a Bluetooth® link, a Zigbee® link, WiFi link, etc. In some instances, communication link 139 may be, or additionally include, a serial link (e.g., USB, IEEE 1394), a parallel link, etc. Reference device 140 can capture sound using the reference microphone 141 and transmits the resultant reference audio signal to the main device 135 via link 139. Main device 135 can use the reference microphone signal to suppress far field noise present in the audio signal captured using main microphone 136. The noise suppressed audio signal can then be transmitted by the main device 135 to the far end.

It will be appreciated that by utilizing microphones of separate devices, noise suppression can be used on devices that do not have two microphones on the same device. Instead, a nearby reference device can be used to provide the reference microphone signal for carrying out noise suppression of the main microphone signal. Furthermore, the distance between the main microphone and the reference microphone can be flexible or variable, and not fixed as in the prior art.

Note that a handset 102 and base station 103 of the telephone 101 shown in FIG. 1, may not be considered as separate devices as the ones shown in FIG. 5. This is because the audio signal (represented by electric current or voltage) from the handset 102 is transferred to the base station 103 via a two wire link without any transformation. On the other hand, in the example shown in FIG. 5, the device 140 transforms the audio signal using transceivers to transfer the audio signal from one device to another. These transceivers can be wireless transceivers (e.g., Bluetooth, Zigbee, WiFi, etc.) or wired transceivers (e.g., USB, IEEE 1394, etc.) and use some protocol to transfer the audio signal.

Figure 6:
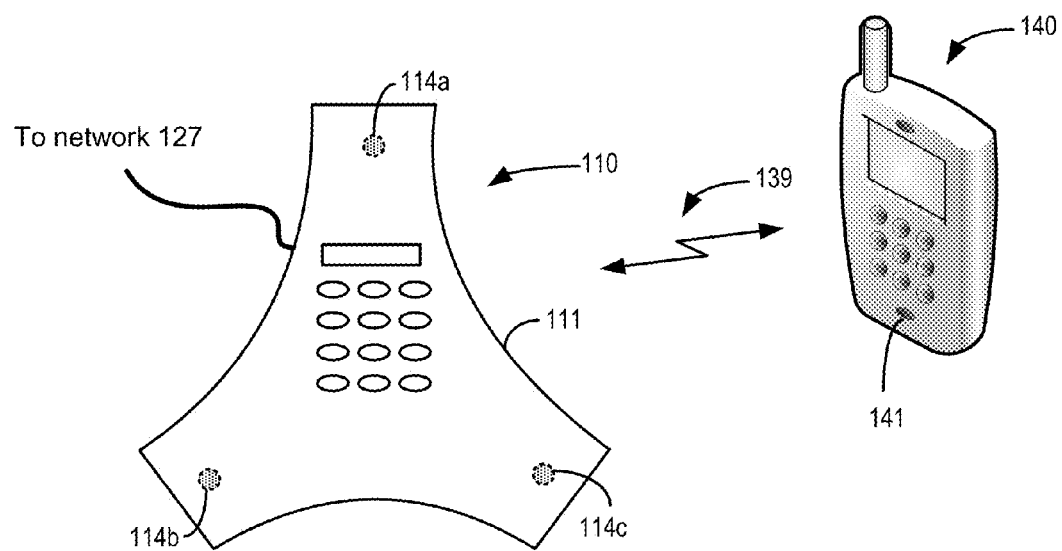
FIG. 6 shows another example of the main microphone and the reference microphones located in separate devices, of which one device is a conference unit.

FIG. 6 shows an example similar to the one shown in FIG. 5, but in which the main device 135 can be a conference unit 110. The main microphone is located on the conference unit 110, while the reference microphone is located on the reference device 140. The Conference unit 110 and the reference device 140 can communicate wirelessly over communication link 139. Any of the existing microphones 114a-c can be used as a main microphone to generate the main microphone signal. Typically, the conference unit 110 can process the generated main microphone signal and transmit it to the far end via network 127. But, for noise suppression, the conference unit 110 can receive a reference microphone signal from the reference device 140 over communication link 139, and use the received reference microphone signal to suppress far field noise present in the main microphone signal before transmitting it to the far end.

Figure 7:
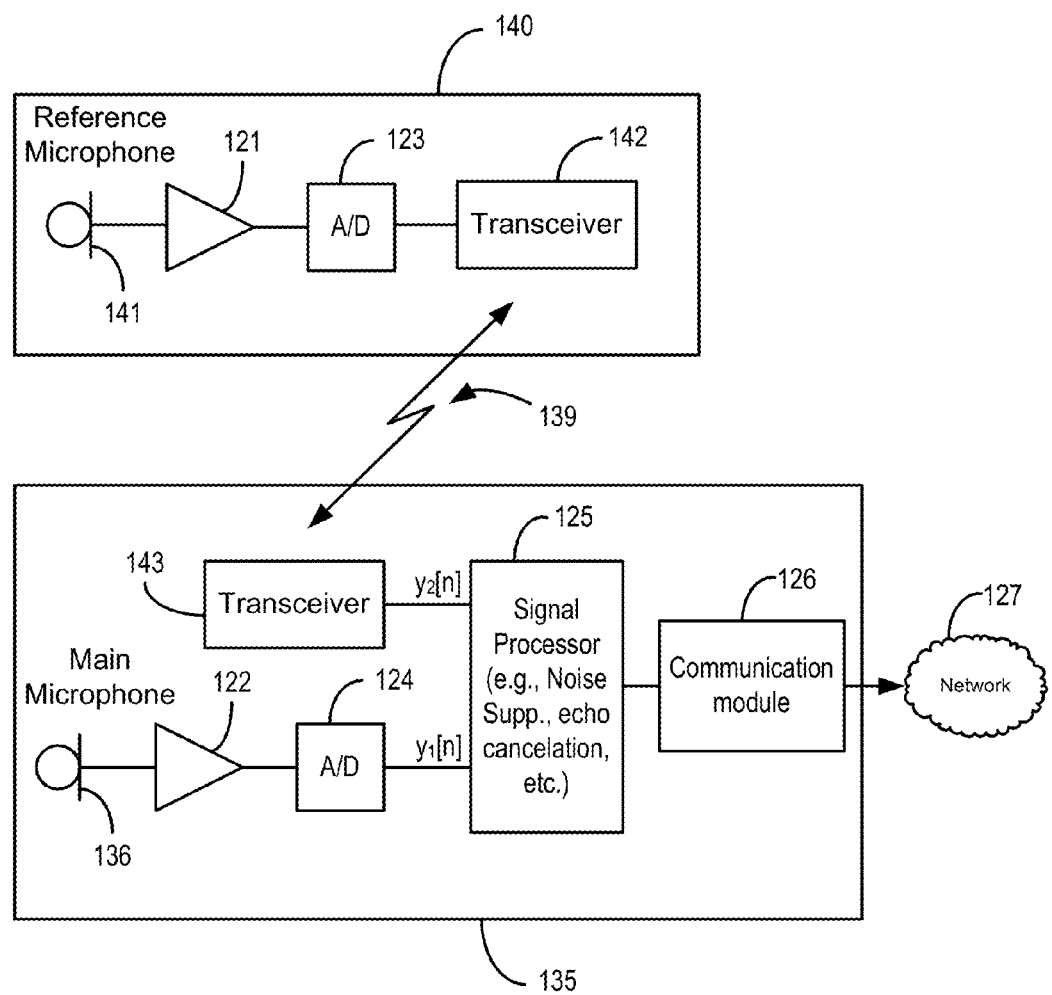
FIG. 7 shows an exemplary block diagram for the examples of FIGS. 5 and 6.

FIG. 7 shows an exemplary block diagram for the system described in FIG. 5 (a similar block diagram can represent the system disclosed in FIG. 6). As mentioned before, main device 135 and reference device 140 can communicate with each other over wireless link 139. This communication can be accomplished via transceivers 142 and 143 in the main device 135 and the reference device 140, respectively. The nature of the transceivers 142 and 143 would depend upon the nature of the communication link 139. For example, if the communication link 139 is a Bluetooth link, then the transceivers 142 and 143 would be Bluetooth transceivers. In some cases the transceivers 142 and 143 may be capable of supporting more than one type of communication link.

The main audio signal generated by the main microphone 136 can be amplified by an amplifier 122 and digitized by an analog to digital converter 124 before being fed to the DSP 125. The digitized main microphone signal is labeled as $y_1[n]$. The reference audio signal generated by the reference microphone 141 can be amplified by an amplifier 121 and digitized by an analog to digital converter 123. The transceiver 142 transmits the digitized reference microphone signal to the transceiver 143 in the main device 135 over communication link 139. The output of the transceiver 143, which output is the digitized reference microphone signal $y_2[n]$, can be fed to the DSP 125. The DSP 125 can use the reference microphone signal $y_2[n]$ to suppress far field noise in the main microphone signal $y_1[n]$.

Figure 8:
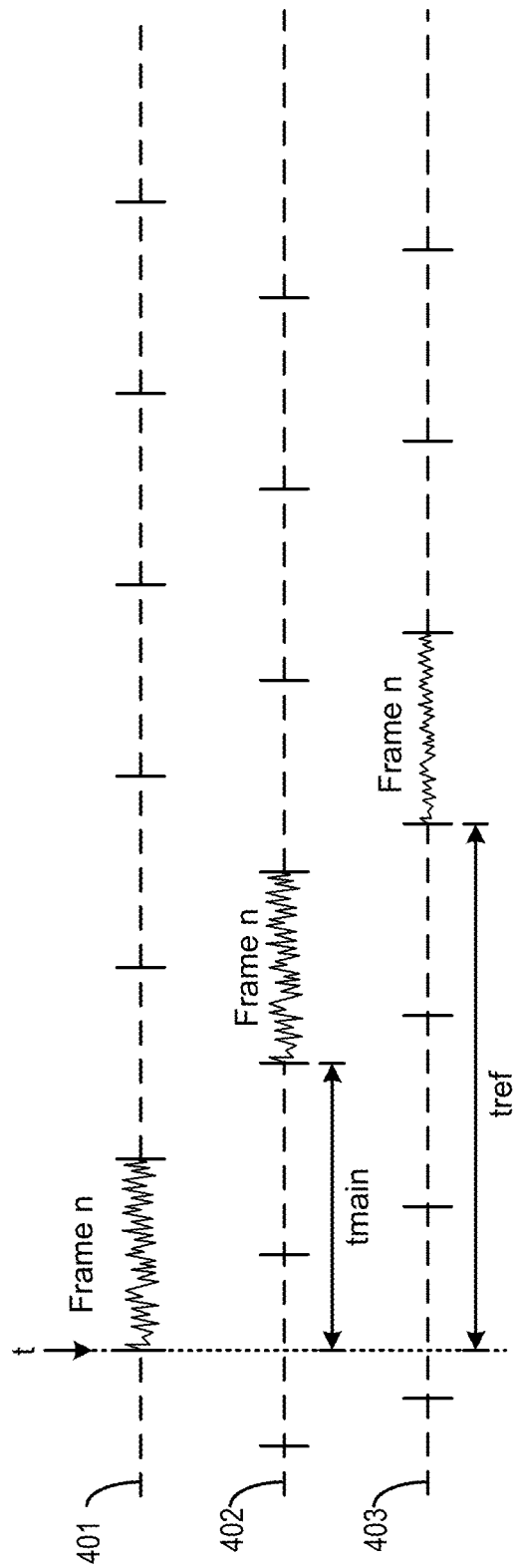
FIG. 8 illustrates a relative delay between the main and reference microphone signals.

The reference microphone signal and the main microphone signal may experience unequal delay paths to the input of the DSP 125. For example, the reference microphone signal may experience more delay compared to the main microphone signal because the reference microphone signal has to additionally pass through the transceivers 142 and 143 before being fed to the DSP 125. Such an exemplary scenario is illustrated in FIG. 8. Dotted line 401 can represent a timeline for capturing audio signals. For the sake of illustration, the timeline can be divided into a number of frames. One such frame, Frame-n, can begin at time t. Lines 402 and 403 can represent the timelines at the main microphone input and the reference microphone input of the DSP 125. In other words, lines 402 and 403 aid in illustrating the amount of time it takes for the main microphone signal and the reference microphone signal to get from the outputs of their respective microphones to the DSP 125.

Referring again to FIG. 7, the main microphone signal can be processed by the amplifier 122, and the A/D converter 124 before being fed as $y_1[n]$ at an input of the DSP 125. The delay associated with this processing is represented by tmain in FIG. 8. The reference microphone can also incur a similar delay due to processing by the amplifier 121 and the A/D converter 123. However, the reference microphone signal can incur additional delay due to processing by the transceiver 142, due to a transmission delay over link 139, and due to processing by transceiver 143 before reaching the DSP 125. The total delay of the reference microphone signal is represented by tref in FIG. 8. As evident from FIG. 8, Frame-n of the main microphone signal can arrive at the DSP 125 earlier than the corresponding Frame-n of the reference microphone signal.

The difference between the time of arrival of Frame-n associated with the main microphone signal and the reference microphone signal can be disadvantageous in some instances. This is because while the DSP 125 can receive Frame-n of the main microphone signal after time tmain, the corresponding Frame-n of the reference microphone signal still may not arrive. The only frames of the reference microphone signal that the DSP 125 may have already received are one or more frames previous to the Frame-n. Thus, if a far field noise event was confined during Frame-n, the mismatch of frames would not allow the DSP 125 to use the appropriate frame of the reference microphone signal to suppress far field noise in the main microphone signal. For all practical purposes, the algorithm can tolerate a small difference between the time of arrival of the main and reference microphones, as long as the difference is within 3 msec.

Figure 9:
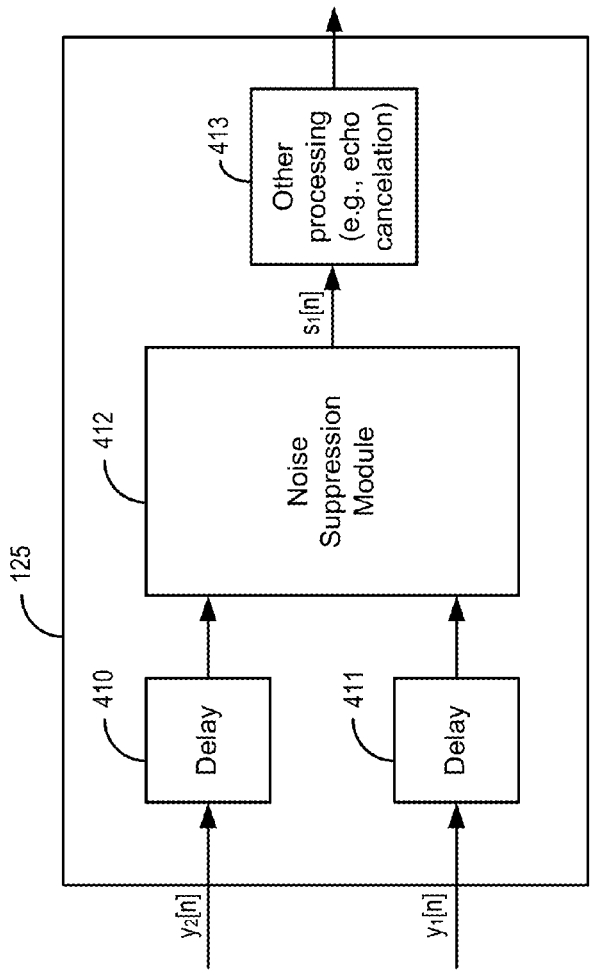
FIG. 9 illustrates an exemplary digital signal processor having time delay blocks for aligning the main microphone and reference microphone signals.

FIG. 9 shows one way for aligning and synchronizing frames of the main and reference microphone signals. DSP 125 can include delay blocks 410 and 411 for delaying input signals $y_2[n]$ and $y_1[n]$ by predetermined duration. Delay blocks 410 and 411 can be separate hardware delay blocks or can be part of pre-existing buffers within the DSP 125. As such, the delay can be implemented even in software by way of a memory and a timer, which implementation is well known in the art. After being delayed, the main microphone signal $y_1[n]$ and reference microphone signal $y_2[n]$ are inputted to the noise suppression module 412 of the DSP 125.

Figure 10:
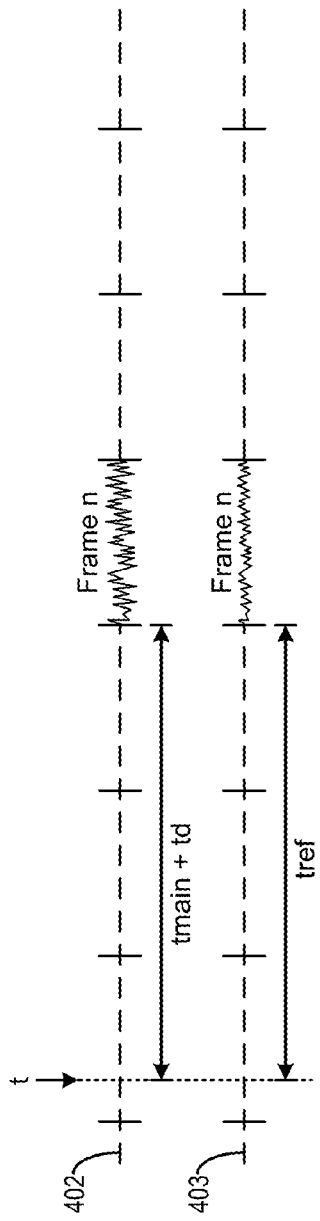
FIG. 10 illustrates aligned main microphone and reference microphone signals by the processor of FIG. 9.

FIG. 10 illustrates an example in which the main microphone signal is delayed such that a frame from the main microphone signal aligns with the corresponding frame from the reference microphone signal. Main microphone signal can be delayed by delay block 411 by a duration td such that the sum of tmain and td are substantially equal to the delay tref incurred by the reference microphone signal. Thus, when the delayed main microphone signal is fed to the noise suppression module 412, Frame-n of the main microphone signal can be aligned with Frame-n of the reference microphone signal. Of course, other frames of the main microphone and reference microphone signals will also be aligned. Although, the example of FIG. 10 does not show the reference microphone signal being delayed, in some cases delaying the reference microphone may also be needed to achieve appropriate alignment of the frames of the main and reference microphone signals.

The delay inserted by the delay blocks 410 and 411 can be constant or programmable. In one example, the values of tmain and tref can be experimentally determined. If these values are determined to be relatively constant, then the delay blocks 410 and 411 can also be set to constant values. In another example, the DSP 125 may, at repeated intervals, determine the round trip time for packets between the two transceivers 142 and 143 (e.g., by sending ping packets). A change in the round trip time can indicate a change in total delay (tref) incurred by the reference microphone signal. Accordingly, the DSP can re-program the delay of delay blocks 410 and 411 to account for this change.

While delaying the main microphone signal aids in frame alignment, such delaying may add to a latency of the main microphone signal to reach the far end. Latency of the main microphone can be the sum of delays in the path of the main microphone signal from the microphone of the near end device to the loudspeaker of the far end device. In other words, the latency can be determined by the sum of delays at the near end, the transmission network, and the far end. For example, referring to FIGS. 7 and 9, the near end latency of the main microphone signal can be determined by summing individual latencies of the amplifier 122, the A/D converter 124, the delay block 411, the noise suppression module 412, additional processing module 413, and the communication module 126. The transmission network latency can be the latency of network 127. The far end latency can be the latency of a far end communication module and of any pre-processing circuitry before the main microphone signal is delivered to a far end loudspeaker. A large latency can make two-way conversation between participants at the near end and the far end uncomfortable. Typically, the latency of the main microphone signal is preferably kept below 200 ms for a two way conversation.

If the delay due to the delay block 411 and the noise suppression module 412 pushes the latency of the main microphone signal over the preferable limit, the DSP 125 can choose not to carry out noise suppression of the main microphone signal. But, even two-way conversations can include durations during which one end can be said to be in a state of monologue. Generally, a monologue can be considered to be a substantially uninterrupted speech by the near end speaker for a given duration (e.g., few seconds to few minutes). Due to the one-way nature of a monologue, large latencies exceeding the preferable limit can go un-noticed at the far end. Therefore, DSP 215 can go back to carrying out noise suppression (including delaying the main microphone signal via delay block 411) when the near end is in a state of monologue.

Figure 11:
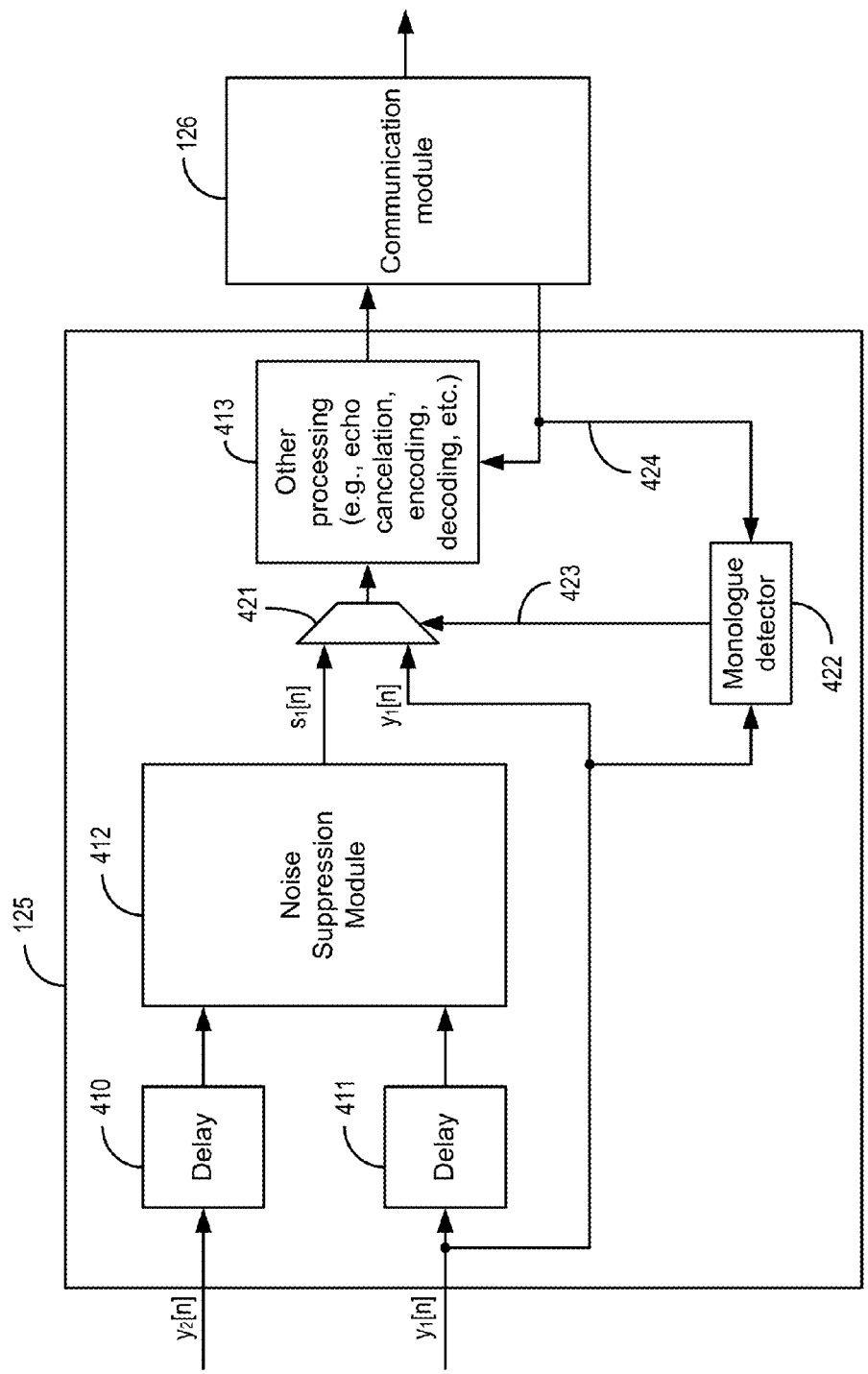
FIG. 11 shows an exemplary digital signal processor having a monologue detector.

FIG. 11 shows the DSP 125 having a monologue detector 422. The DSP 125 can activate the monologue detector 422 only when it has been determined that the near end latency of the main microphone signals is above acceptable limits. Once activated, the monologue detector 422 can monitor both the main microphone signal $y_1[n]$ and one or more far end microphone signals 424 to detect whether the near end speaker has entered a monologue. If no monologue is detected, then the monologue detector can output a signal 423 to a multiplexer 421, which selects the main microphone signal $y_1[n]$ (bypassing delay block 411 and noise suppression module 412) that has not been noise suppressed. On the other hand, if the monologue detector 422 detects a monologue, then it can output a signal 423 to the multiplexer 421, which selects the noise suppressed main microphone signal $s_1[n]$. If the DSP 125 determines that the near end latency is within acceptable limits, the monologue module 422 can be disabled and the control signal 423 can be set to a value such that the multiplexer selects noise suppressed main microphone signal $s_1[n]$ as its output.

Figure 12:
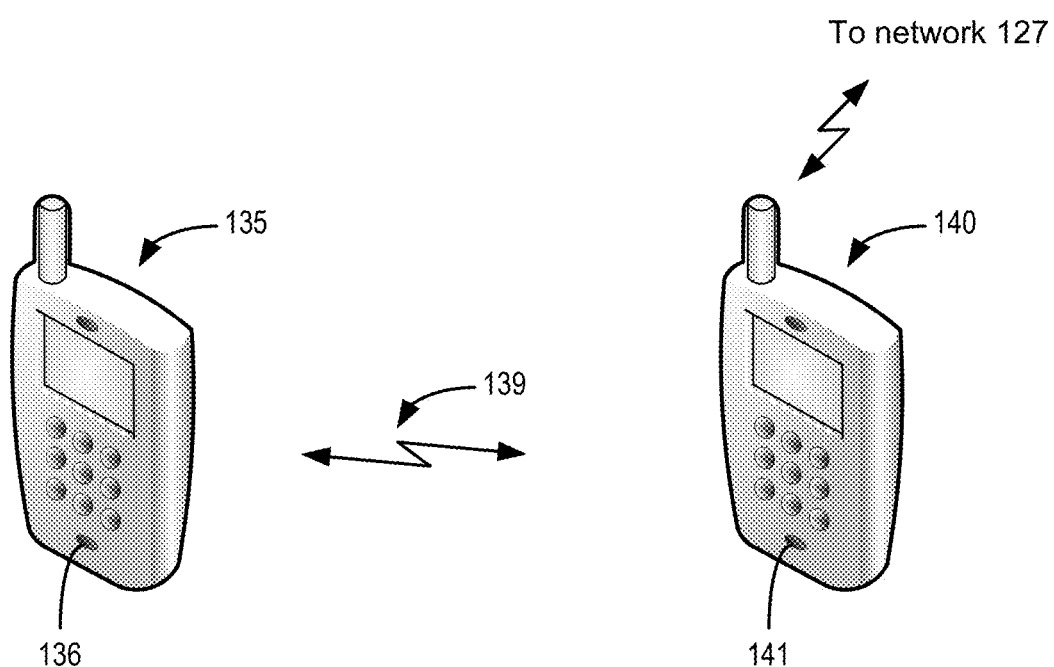
FIG. 12 shows another example in which the main microphone and the reference microphone are located on separate devices, but in which the main microphone signal, instead of the reference microphone signal, is transmitted from one device to the other device.

Referring again to FIG. 5, one can see that it was the reference microphone signal that was transmitted from the reference device 140 to the main device 135. This was done because it's the main device 135, and not the reference device 140, that is connected to the far end. However, the opposite scenario is also possible in which the reference device 140, instead of main device 135, is connected to the far end. In such a scenario, as shown in FIG. 12, the main microphone signal would have to be transmitted from the main device 135 to the reference device 140 over communication link 139. The main microphone signal would be subsequently processed at the reference device 140 to carry out noise suppression and transmitted to the far end via network 127. In one example, both the main device and the reference device, when not communicating with each other over the communication link 139, can capture near end audio and separately and independently transmit the near end audio to one or more far end devices.

Figure 13:
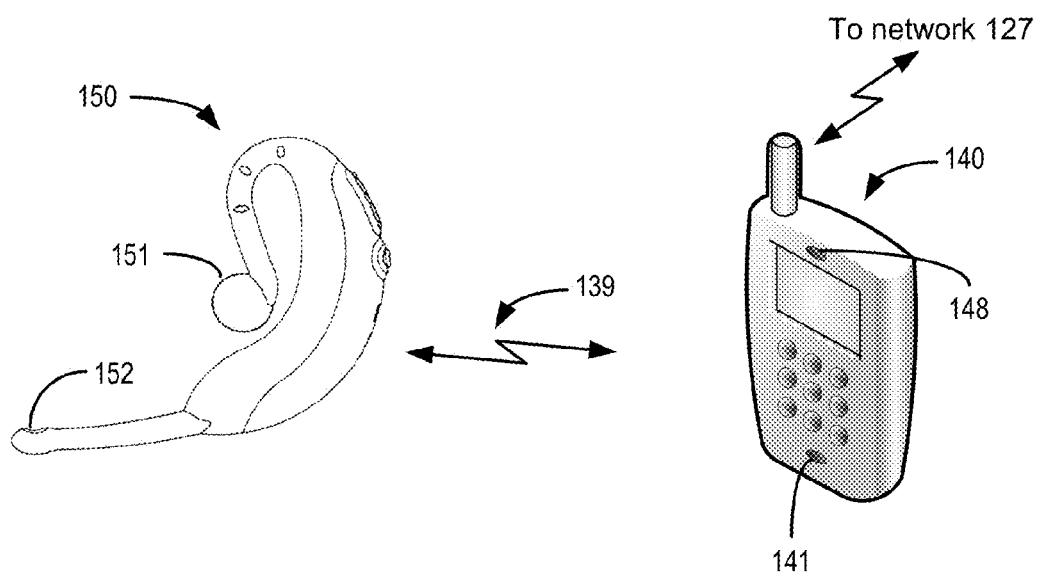
FIGS. 13 and 14 show two more examples similar to the example of FIG. 12, but in which only one of the two separate devices can communicate with the far end.

Another example, in which the main microphone signal is transmitted from the main device to the reference device, is depicted in FIG. 13. FIG. 13 shows a wireless mobile phone 140 that can wirelessly communicate with a wireless headset 150 over wireless link 139. Mobile phone 140 is typically used by the user for receiving and initiating phone calls with the far end over a mobile/cellular phone network (not shown). The user can listen to the received far end audio via speaker 148, and speak into microphone 141, which generates a near end audio signal to be sent to the far end. This, however, requires the user to use one hand to hold the mobile phone's 140 speaker 148 against the user's ear. The headset 150 alleviates the necessity of using the hand to hold the phone. Instead, the headset 150 fits around the users ear such that the speaker 151 is near the user's ear-canal and the microphone 152 extends out towards the user's mouth. The mobile phone 140 can conveniently stay in the user's pocket, on the desk, etc. Audio signals received by the mobile device 140, which audio signals were previously sent to the speaker 148, are now transmitted to the headset 150 over the communication link 139 for reproduction at speaker 151. Similarly, user's voice is captured by the headset microphone 152 and transmitted to the mobile phone 140 over communication link 139. Typically, when the headset 150 is operational, the mobile phone 140 disables its own speaker 148 and microphone 141.

For noise suppression, the mobile phone 140 can activate its microphone 141 even when the headset 150 is operational. In such a scenario, the headset microphone 152 can capture the user's voice signal, and the mobile phone's 140 microphone 141 can be used to capture the far field noise. In other words, the headset microphone 152 can provide the main microphone signal and the mobile phone's microphone 141 can provide the reference microphone signal.

In normal operation, the main microphone signal from the headset 150 would be transmitted to the mobile phone 140, which, in turn, would process the signal and transmit the processed signal to the far end. During noise suppression, however, the mobile phone 140 can use the reference microphone signal generated by the microphone 141 to suppress far field noise appearing in the main microphone signal received from the headset 150.

Figure 14:
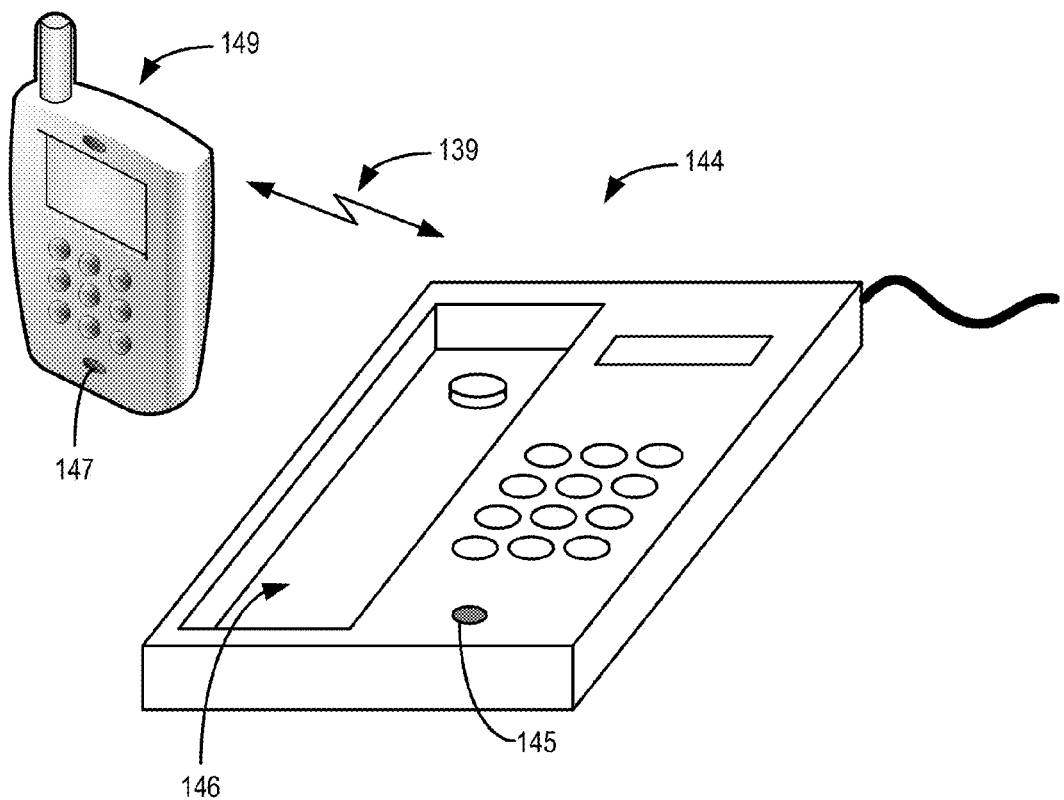

FIG. 14 shows yet another example, in which the main microphone signal is captured by a cordless handset 149 and transmitted to the base station 144 over wireless link 139. The base station 144 includes a reference microphone 145, which captures a reference microphone signal. Thus, the cordless handset 149 can be considered to be the main device while the base station 144 can be considered to be the reference device. Under normal operation, the near end user may lift the cordless handset 149 from the cradle 146 of the base station 144, and initiate communication with the far end. The main microphone signals captured by the main microphone 147, as well as any user input on a user interface of the cordless handset 149, can be wirelessly transmitted over wireless link 139 to the base station 144. The wireless link 139 can be based on, for example, the Digital Enhanced Cordless Telecommunication (DECT) 6.0 standard. Once the main microphone signals is received at the base station 144, the base station 144 carries out noise suppression using the reference microphone signal, and the noise suppressed main microphone signal can be sent to the far end.

One distinguishing feature between the scenarios of FIGS. 13 and 14 and the scenario of FIG. 12 is that while both the main and reference device of FIG. 12 are capable of independently establishing communication to far end devices over network 127, the headset 150 of FIG. 13 and the cordless handset 149 of FIG. 14 lack the ability to independently establish communication with a far end device. Instead they rely on the reference device (e.g., the mobile phone 140 and the base station 144) to establish such communication. Therefore, the far field noise suppression disclosed herein can be used where at least one of or both the main device and the reference device is or are able to independently communicate with a far end device.

Figure 15:
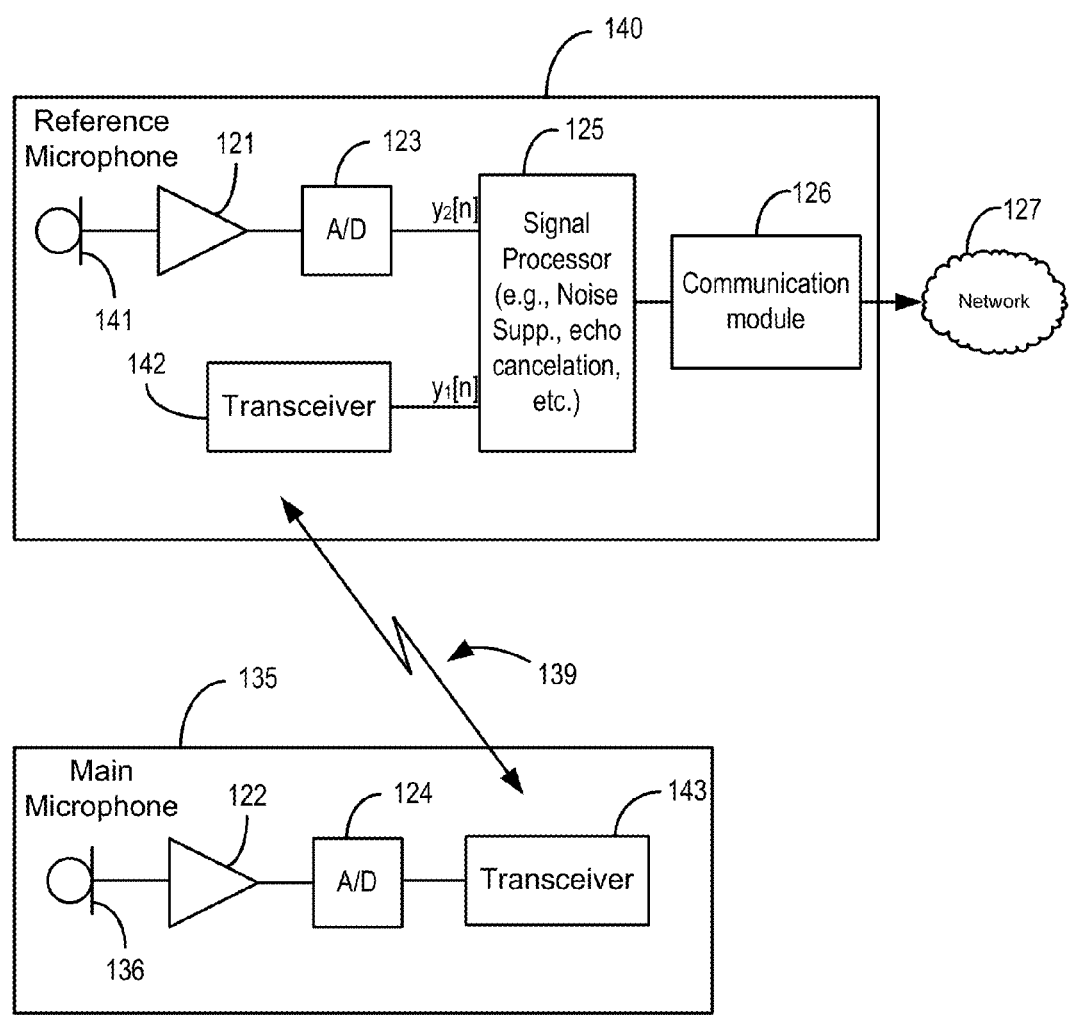
FIG. 15 shows an exemplary block diagram for the examples of FIGS. 12-14.

FIG. 15 shows a generalized block diagram of the devices shown in FIGS. 12, 13 and 14. As discussed previously, the main microphone signal is captured at the main device 135 by main microphone 136. The main microphone signal is amplified by amplifier 122, digitized by A/D converter 124, and transmitted to the reference device 140 via transceiver 143, communication link 139, and transceiver 142. The reference microphone signal is captured at the reference device 140 by reference microphone 141. The reference microphone signal is amplified by amplifier 121, digitized by A/D converter 123 and fed to an input of the DSP 125. Thus, the DSP 125 receives the main microphone signal $y_1[n]$ and the reference microphone signal $y_2[n]$ at its inputs.

The DSP 125 of FIG. 15 can align frames from the main microphone signal and the reference microphone signal by delaying the reference microphone signal. This is because, unlike FIG. 5, in which the reference microphone signal lagged behind the main microphone signal, in FIG. 15 it's actually the main microphone signal that lags behind the reference microphone signal. In other words, tmain would be greater than tref. As such, the configuration of the DSP 125 shown in FIG. 9 can stay the same, except that the delay provided by the delay block 410 to the reference microphone signal is greater than that provided by delay block 411 to the main microphone signal. Specifically, the delay block 410 can delay the reference microphone signal by time td such that the sum of tref and td is equal to the time tmain—the delay associated with the main microphone signal.

The monologue detector 422 can also operate in a manner similar to that described previously with respect to FIG. 5, in that the monologue detector 422 can be enabled when it is determined that the latency of the main microphone signal is greater than an acceptable limit. However, for the scenario depicted in FIG. 15, the resulting improvement in latency of the main microphone signal would be limited to avoiding delays due to delay block 411 and the noise suppression module 412.

Having discussed various configurations for main and reference microphones and the devices where they can be located, the discussion now turns to describing the far field noise suppression methods used by the DSP 125. As was mentioned above, the DSP 125 can utilize at least two separate methods. In one method, the noise suppression is carried out by subtracting an estimate of the far field noise from the main microphone signal, which estimate is derived from the reference microphone signal. In the second method, the noise suppression is carried out by preventing transmission of the main microphone signal whenever the near end talker is not talking.

Figure 16:
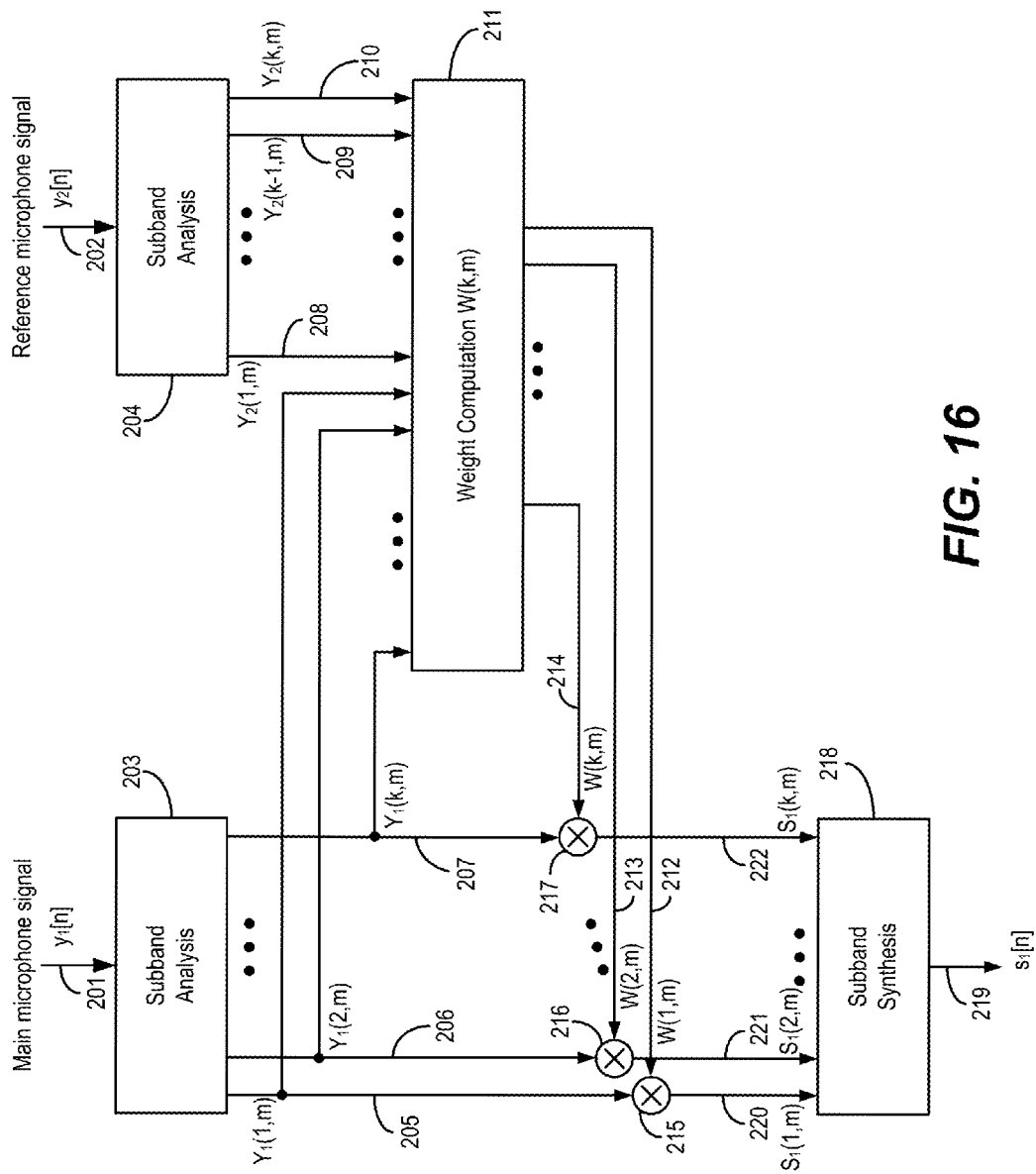
FIG. 16 illustrates an exemplary signal flow diagram for suppressing far field noise in the main microphone signal.

FIG. 16 shows a signal flow diagram of the first far field noise suppression scheme employed by the DSP 125. As a first step, the main microphone signal $y_1[n]$ 201 and the reference microphone signal $y_2[n]$ 202 are passed through subband analysis filters 203 and 204 respectively. Subband analysis filter banks 203 and 204 can each include a set of filters arranged in parallel that split the input signal into a number of frequency subbands. The number of subbands is determined by the number of filters used in parallel. Preferably, the subband analysis filters 203 and 204 use a large number of filter banks to split the signals $y_1[n]$ 201 and $y_2[n]$ 202 into correspondingly large number of subbands. For example, subband analysis filters 203 and 204 can include 480 or more filters to produce 480 or more subbands. One advantage of having a large number of subbands is the simplification of downstream filters by way of requiring smaller number of taps. In other words, as the number of subbands increases, the number of taps in filters used downstream for processing signals within each subband decreases. Having a smaller number of taps results in faster filters. Again as an example, if the main microphone signal $y_1[n]$ 201, which is sampled at 48 Ksamples/s with a 10 ms frame rate, is passed through the subband analysis filter 203 having 480 subbands, the signal $y_1[n]$ 201 would be split into 480 subbands with each subband having a single frequency domain coefficient. As a result, filters (e.g. finite impulse response or FIR filters) used downstream for processing within each subband would need to have only a single tap—resulting in very simple and fast processing.

FIG. 16 shows the output of the subband analysis filter 203 resulting in k subband signals $Y_1(1,m)$ 205 to $Y_1(k,m)$ 207, where k is the subband index and m is the time index (or the frame index). This means that the main microphone signal $y_1[n]$ 201 is split into subband signals $Y_1(1,m)$ 205 to $Y_1(k,m)$ 207. Similarly, subband analysis filter 204 splits reference microphone signal $y_2[n]$ 202 into $Y_2(1,m)$ 208 to $Y_2(k,m)$ 210 subband signals. While the output subband signals of subband analysis filters 203 and 204 are shown to be in the frequency domain, it is understood that, if necessary, the subband signals can be easily converted and operated in the time domain.

Subband signal outputs from both the subband analysis filters 203 and 204 are sent to the weight computation block 211. Before getting into details of the weight computation block 211 (which are discussed below with reference to FIG. 17), one can see that the outputs of the weight computation block 211, weight subband signals $W(1,m)$ 212 to $W(k,m)$ 214, are multiplied with corresponding main microphone subband signals $Y_1(1,m)$ 205 to $Y_1(k,m)$. The weight subband signals are a result of determination of an estimate of the noise signal present in the reference microphone subband signals (the reference noise estimate) and the determination of the estimate of coupling between the main microphone and the reference microphone subband signals. When multiplied with the main microphone subband signals, the weight subband signals suppress the far field noise signals estimated to be present in the main microphone subband signal. The resultant main microphone subband signals are noise suppressed. These noise suppressed main subband signals are then input to a subband synthesis block 218, which combines the k subbands to produce a noise suppressed main microphone signal $s_1[n]$ 219.

Figure 17:
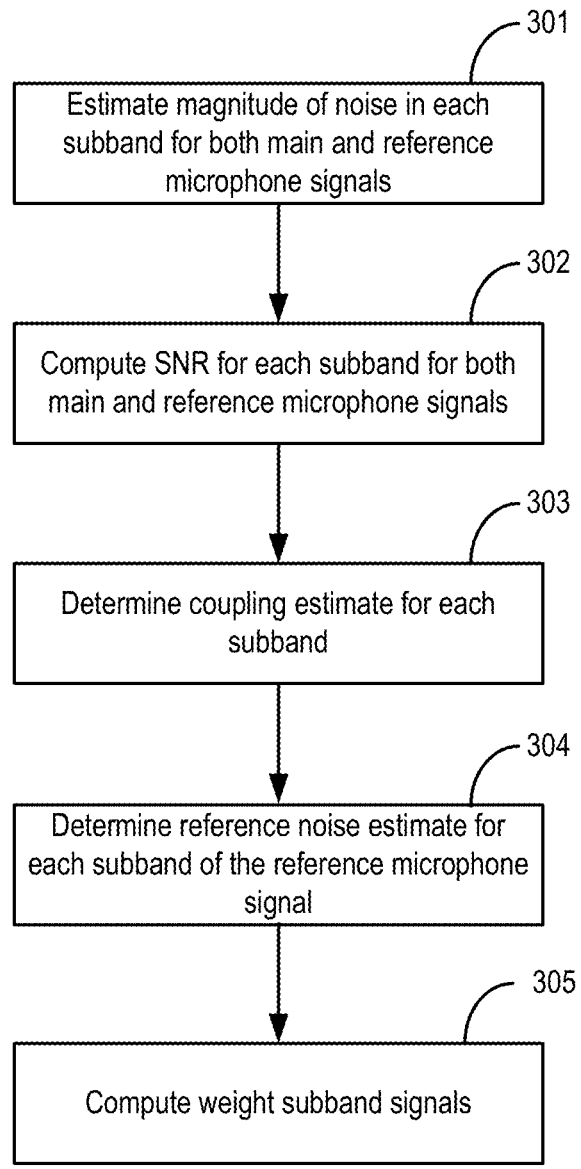
FIG. 17 shows an exemplary flow chart for the steps executed by the digital signal processor for suppressing far field noise in the main microphone signal.

The generation of weight subband signals $W(1,m)$ 212 to $W(k,m)$ 214 is shown in further detail in FIG. 17. In step 301, the DSP 125 estimates the magnitude of noise signal present in the main microphone signals $Y_1(1,m)$ 205 to $Y_1(k,m)$ 207 and in the reference microphone signals $Y_2(1,m)$ 208 to $Y_2(k,m)$ 210. Noise estimate for a subband is typically determined by averaging the magnitude of the signal over a few frames when no voice signal is present. Noise estimates $N_1(k,m)$ and $N_2(k,m)$ are expressed by the following equations:

$$N_1(k,m) = E\{|Y_1(k,m)|\} \quad (1)$$

$$N_2(k,m) = E\{|Y_2(k,m)|\} \quad (2)$$

where $E\{\ \}$ is the average magnitude of a signal over a few frames when no voice signal is active.

Once the noise estimates for each subband for the main and reference microphone signals is determined, step 302 determines the signal to noise ratio (SNR) for each subband. The equations of SNR for each subband of the main and reference microphone signals is given below:

$$SNR_1(k,m) = \frac{|Y_1(k,m)|}{N_1(k,m)} \quad (3)$$

$$SNR_2(k,m) = \frac{|Y_2(k,m)|}{N_2(k,m)} \quad (4)$$

In the next step 303, the DSP 125 determines a coupling estimate between the main microphone signal and the reference microphone signal in each subband. The coupling estimate $\alpha(k,m)$ is expressed by the following equation:

$$\alpha(k,m) = \alpha(k,m-1) + \beta(k,m)\frac{(|Y_1(k,m)| - \alpha(k,m-1)|Y_2(k,m)|)}{t_1|Y_2(k,m)| + (t_1-1)|Y_2(k,m-1)|} \quad (5)$$

where, $$\beta(k,m) = \min\left(1, t_2\frac{SNR_2(k,m)}{SNR_1(k,m)}\right) \quad (6)$$

In Equation (5), $\alpha(k,m)$ denotes the coupling estimate between the main microphone signal $Y_1(k,m)$ and the reference microphone signal $Y_2(k,m)$ for each subband k. Generally, the coupling estimate can be a measure of the ratio of the magnitudes of the main microphone signal and the reference microphone signal. α(k,m) is adaptive, in that it modifies (if erroneous) the coupling estimate of the previous frame, denoted by α(k,m−1), to determine the coupling estimate for the current frame. For example, if the coupling estimate in the previous frame α(k,m−1) were precisely correct for the current frame, then the numerator (|Y$_1$(k,m)|−α(k,m−1)|Y$_2$(k,m)|) would be zero. As a result, the coupling estimate α(k,m) for the current frame would be equal to that determined for the previous frame. If however, the magnitudes of the main and reference microphone subband signal have sufficiently changed to alter the coupling, then the error (calculated by previously mentioned numerator) is normalized (by the denominator), multiplied by the step size denoted by β(k,m), and added or subtracted from the previous frame's coupling estimate. The step size β(k,m) represents the magnitude of correction being applied, and is typically less than or equal to 1. Larger the magnitude of correction, faster the coupling estimate adapts. β(k,m) is typically a function of the ratio of SNRs of the reference microphone subband and the main microphone subband signals. The DSP 125 can select a maximum possible step size by having $t_2$=1, and minimum possible step size by having $t_2$=0.

In step 304, the DSP 125 determines the reference noise estimate for each of the reference microphone subband signals, Y$_2$(k,m). The equation for the estimate, denoted by $\tilde{V}_2$(k,m), is given below:

$$\tilde{V}_2(k, m) = (1 - \gamma)\tilde{V}_2(k, m - 1) + \gamma|Y_2(k, m)| \quad (7)$$

where, (8)

$$\gamma = \alpha_2 \min\left(1, \frac{SNR_2(k, m)}{SNR_1(k, m)}\right)$$

In Equation (8) above, 0<α$_2$<1 is the smoothing constant. As discussed previously, the far field noise suppression is carried out by determining the reference noise estimate, combining this reference noise estimate with the coupling estimate between the main microphone and the reference microphone to estimate the far field noise component in the main microphone, and finally subtracting the far field noise estimate from the main microphone signal. Equation (7) estimates one of the aforementioned quantities: the reference noise estimate. Generally, the reference noise estimate can be made equal to the magnitude of the reference microphone signal Y$_2$(k,m) itself. But, there may be instances when the reference microphone may also include the signal of interest, e.g., the voice of the speaker. In such instances, the reference microphone signal cannot be directly equated to the reference noise estimate, because doing so would result in subtracting the voice signal from the main microphone signal.

Equation (7) employs variable γ to address this issue. As shown in Equation (8), γ is a function of the ratio of the SNR$_2$(k,m) and SNR$_1$(k,m), which are the signal to noise ratios for the reference microphone and the main microphone signals for each subband, respectively. In scenarios where the speaker is talking, SNR$_2$(k,m) would be considerably smaller than SNR$_1$(k,m) because of the relative proximity of the main microphone to the speaker. As a result, the ratio of SNR$_2$(k,m) over SNR$_1$(k,m) would be considerably less than 1. Assuming that the smoothing constant is equal to 1, γ would have a value that is considerably less than 1. Referring again to Equation (7), we see that γ is multiplied with the magnitude of the reference microphone signal, |Y$_2$(k,m)|, and (1−γ) is multiplied with the estimate from the previous frame, $\tilde{V}_1$(k,m−1). Because γ is considerably less than 1, the reference noise estimate $\tilde{V}_1$(k,m) for the current frame m would essentially assume the estimate of the previous frame, and the contribution of the reference microphone signal for the current frame, which includes the voice signal, is desirably kept very small.

In scenarios where the speaker is not talking, the signal captured by the reference microphone signal is a good estimate of the far field noise. In such cases, the ratio of SNR$_2$(k,m) over SNR$_1$(k,m) would be approximately equal to 1. Again assuming that the smoothing constant α$_2$=1, γ would be approximately equal to 1. As a result, the reference noise estimate would be largely composed of the magnitude of the reference microphone signal for the current frame, |Y$_2$(k,m)|.

Note that $\tilde{V}_1$(k,m) is updated every frame, and, as a result, estimates near instantaneous far field noise. This is in contrast with the prior art technique of measuring stationary noise, which technique measures noise over a long period of time (typically 1-2 seconds). Thus short-lived far field noise phenomenon, which would be ignored by the stationary noise technique, would be included in the reference noise estimate $\tilde{V}_1$(k,m). Also, in contrast with the stationary noise cancellation technique, $\tilde{V}_1$(k,m) monitors the presence of the voice signal, and automatically adapts such that the contribution of the voice signal on the reference noise estimate is minimal.

Once the estimates of coupling between the main microphone and the reference microphone and reference noise estimate for each subband are known, the DSP 125, in step 305, can compute the weight signals W(k,m) for each subband, as described by the following equation:

$$W(k, m) = 1 - \alpha(k, m)\frac{\tilde{V}_2(k, m)}{|Y_1(k, m)|} \quad (9)$$

Where the reference noise estimate $\tilde{V}_1$(k,m) is divided by |Y$_1$(k,m)| for normalization. Referring again to FIG. 16, the weight signal for each subband is multiplied with the corresponding main microphone subband signal by multipliers 215-217. The output of these multipliers results in Y$_1$(k,m)− Y$_1$(k,m)α(k,m)$\tilde{V}_2$(k,m)/|Y$_1$(k,m)|. In other words, the estimate of far field noise in each subband of the main microphone, represented by the term Y$_1$(k,m)α(k,m)$\tilde{V}_2$(k,m)/|Y$_1$(k,m)|, is subtracted from the main microphone subband signal Y$_1$(k,m), resulting in a noise suppressed main microphone signal S$_1$(k,m).

The noise suppressed main microphone subband signals S$_1$(1,m) 220, S$_1$(2,m) 221 . . . , S$_1$(k,m) 222 are subband synthesized by the subband synthesis filter 218. Output of the subband synthesis filter 218 is a time domain, noise suppressed, main microphone signal s$_1$[n] 219.

The second method of suppressing far field noise in the main microphone signal is now explained. As mentioned above, the second method—local talk detection—suppresses far field noise in the main microphone signal by suppressing the main microphone signal itself when no local talk is detected. At other times, i.e., when the local participant is talking, no suppression is carried out. During the time when no suppression is carried out, the DSP 125 may continue to process the main microphone signal as it normally would for transmission to the far end.

Figures 18A, 18B:
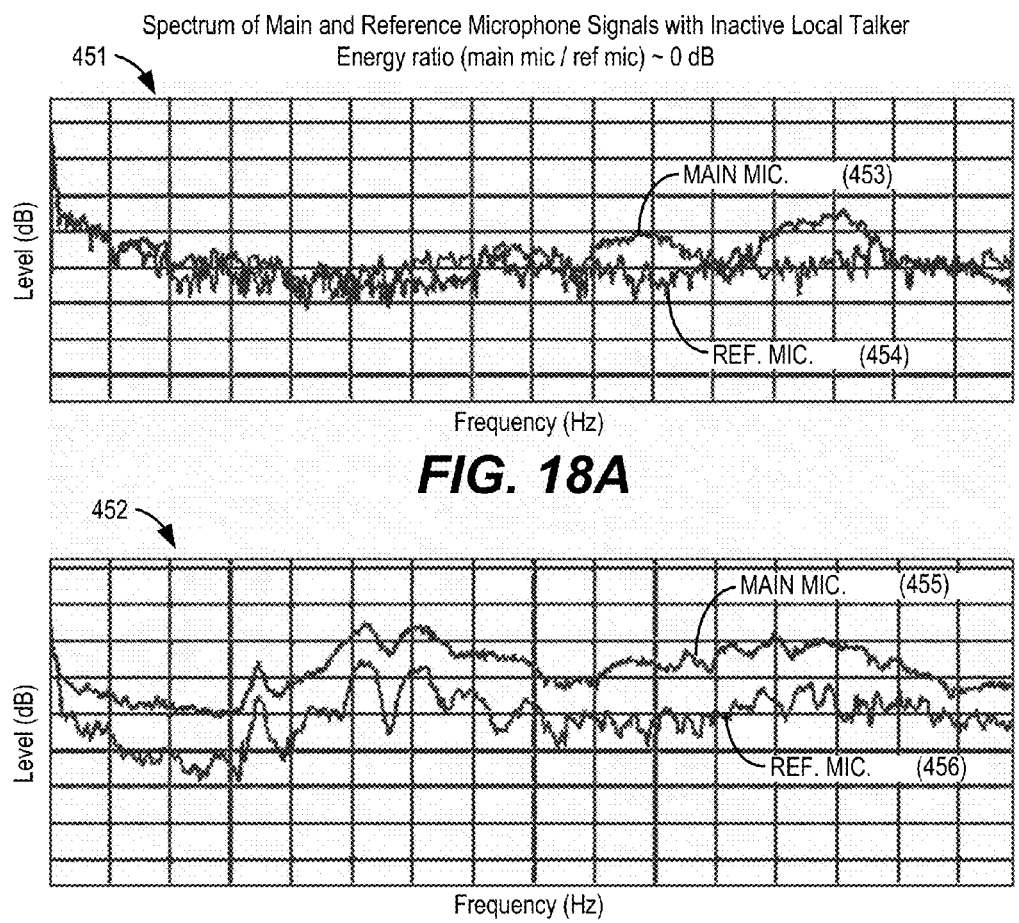
FIGS. 18A and 18B shows an example of the difference between the spectrums of the main and reference microphone signals when the local talker is inactive and active.

The local talk detection can be carried out using both the main microphone signal and the reference microphone signal. One such way of local talk detection is shown in FIGS. 18A and 18B, which show spectral levels of the main and reference microphone signals when the local talker is inactive and active, respectively. Plot 451 shows the spectral characteristics of the main 453 and reference 454 microphone signals that have been collected simultaneously for one time frame (typically 10 ms). The vertical axis of the plot 451 can represent amplitude, power, energy, etc. of the main 453 and reference 454 microphone signals for various frequencies. The spectral levels of the main 453 and reference 454 microphone signals remain relatively same for majority of the spectrum when the local talker is inactive.

But when the local talker is active, the relative spectral levels of the main and reference microphone signals are no longer the same. This can be seen in FIG. 18B, in which plot 452 shows that there is appreciable difference between the spectral levels of the main microphone signal 455 and the reference microphone signal 456. Measurements have shown that the difference is in the range of 6 dB-10 dB across the spectrum. This difference is primarily due to the closer proximity of the local talker's mouth to the main microphone than to the reference microphone. As will be discussed below, this difference can be used to determine a threshold value over which the DSP 125 can be certain that the local talker is active.

It will be appreciated that comparing relative spectral levels of the main and reference microphone signals is only one exemplary approach to local talk detection, and that other methods, such as comparing time domain amplitude levels, comparing transformed (e.g., Fourier transform) main and reference microphone levels, etc., may also be used.

Figure 19:
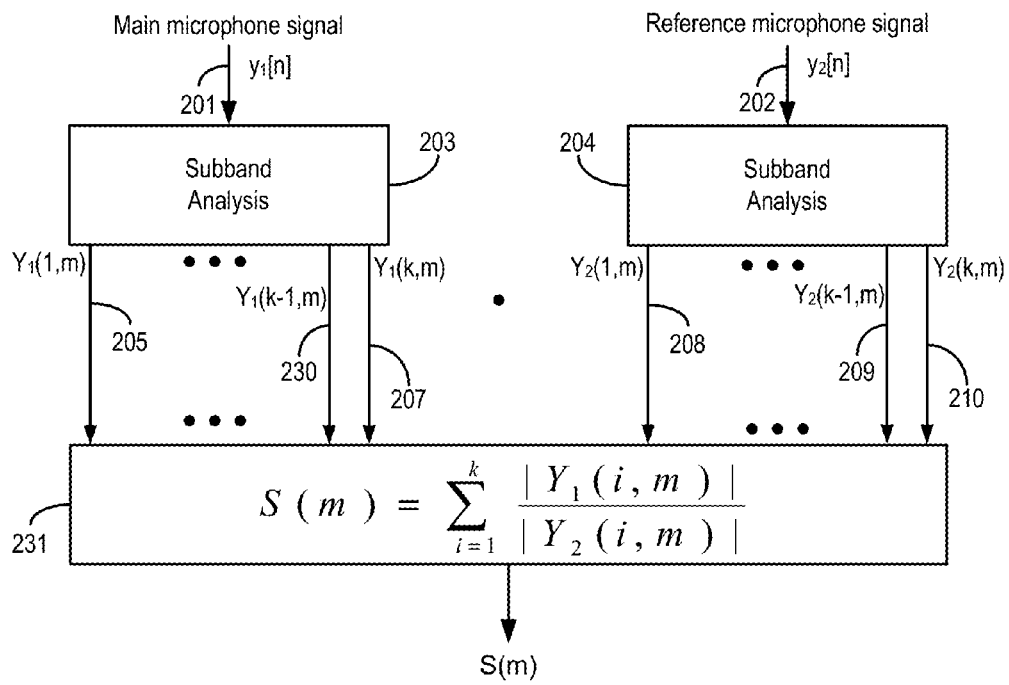
FIG. 19 illustrates an exemplary block diagram for quantifying the difference between the main and reference microphone signals.

As previously discussed with respect to FIGS. 18A and 18B, there is appreciable difference in spectral levels of the main and reference microphone signals when the local talker is active. FIG. 19 illustrates one approach in quantifying this difference. The main microphone signal $y_1[n]$ 201 and the reference microphone signal $y_2[n]$ are fed to subband analysis blocks 203 and 204, respectively. The subband analysis blocks 203 and 204 have been previously discussed with reference to FIG. 16, and are therefore not discussed further. It is understood that the subband analysis blocks 203 and 204 can split their respective input signals into k subbands. For example, the subband analysis block 203 splits the main microphone signal $y_1[n]$ 201 into subband signals $Y_1(1,m)$ 205 to $Y_1(k-1,m)$ 230 and $Y_1(k,m)$ 207. Similarly, the subband analysis block 204 splits the reference microphone signal $y_2[n]$ into subband signals $Y_2(1,m)$ 208 to $Y_2(k-1,m)$ 209 and $Y_1(k,m)$ 210. As mentioned before, k is the subband index while m is the time index (or the frame index).

The example of FIG. 19 quantifies the difference between the main and reference microphone signals by summing the ratios of their amplitude (or energy, power, etc.) levels within each subband. This sum, S(m), is determined by the sum block 231. As shown in FIG. 19, the sum S(m) is expressed as:

$$S(m) = \sum_{i=1}^{k} \frac{|Y_1(i, m)|}{|Y_2(i, m)|} \quad (10)$$

It will be appreciated that other approaches to quantifying the difference between the main and the reference microphone signals can also be taken. For example, instead of taking the ratio of the levels of the main and the reference microphone signal for each subband, one can take the difference between them. In another approach, instead of summing the ratios across all subbands, one can take an average of all the ratios.

In some instances a double talk detector can be adapted to determine the sum S(m). Double talk detectors are commonly used in telecommunication signal processing to aid echo cancellation. The double talk detector detects simultaneous near end and far end speech. One exemplary approach to determining double talk is shown in equation (11) below:

$$D(m) = \sum_{i=1}^{k} \frac{|Y_{mic}(i, m)|}{|Y_{spk}(i, m)| ERL(i)} \quad (11)$$

Where $|Y_{mic}(i,m)|$ and $|Y_{spk}(i,m)|$ are the energy or amplitude levels of the main microphone signal and the speaker signal in the ith subband and the mth audio frame. ERL(i) is the echo return loss estimate of the ith subband. The double talk detector declares a double talk state when the value of D(m) exceeds a predefined threshold. If the $Y_{spk}(i,m)$ were to be replaced by the reference microphone signal $Y_2(i,m)$, and the ERL(i) were to be equated to unity, D(m) would be the same as S(m) of equation (10). Therefore, hardware or program code or both for double talk detector already present in the DSP 125 can be reused to also determine the sum S(m).

Figure 20:
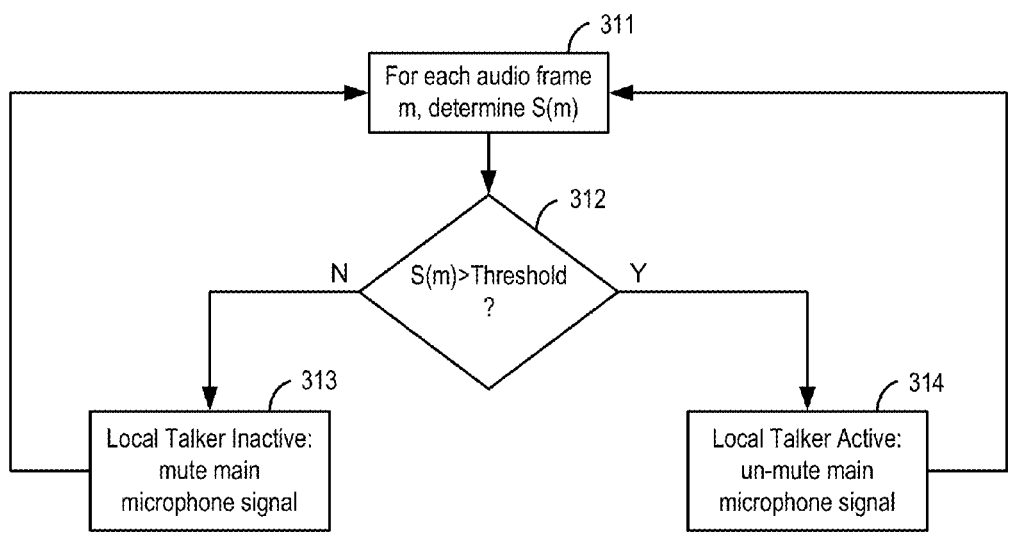
FIG. 20 shows an exemplary flowchart for steps executed by the digital signal processor for detecting activity of the local talker and suppressing far field noise.

FIG. 20 shows a flowchart illustrating the steps performed by the DSP 125 in suppressing far field noise. The DSP 125 determines the sum S(m), described above, for each audio frame m (step 311). After determining the sum S(m), the DSP 125 compares the sum to a threshold value Th (step 312). If the sum S(m) exceeds this threshold value, then the local talker can be considered to be active; if however the sum S(m) is less than the threshold value Th, then the local talker can be considered to be inactive. The threshold value Th can be experimentally determined. For example, referring again to FIG. 18B, it was observed that when the local talker is active, the difference between the main and the reference microphone signals is in the range of 6 dB-10 dB across the spectrum. Therefore, one exemplary threshold value Th can be 10 dB multiplied by the total number of subbands k. In this case, because the threshold value Th is being expressed in dB, the comparison step 312 can compare $10 \log_{10} S(m)$ to the threshold value of k×10 dB.

If the comparison step 312 determines that the sum S(m) is not greater than the threshold Th, then the local talker is considered to be inactive. Subsequently, in step 313, the DSP 125 can mute the main microphone signal. As a result, any far field noise (stationary or non-stationary) captured by the main microphone would be prevented from being transmitted to the far end. It is understood that the DSP 125 can suppress or interrupt the transmitting of far field noise captured by the main microphone to the far end by using approaches other than simply muting the main microphone. For example, the DSP 125 may instead choose to keep the main microphone on, but attenuate the main microphone signal to such an extent that any far field noise is inaudible at the far end. In another example, the DSP 125 may transmit comfort noise or white noise to the far end in place of the main microphone signal or in addition to an already attenuated main microphone signal.

If, however, the comparison step 312 determines that the sum S(m) is greater than the threshold Th, then the local talker is considered to be active. Subsequently, in step 314, the DSP 125 can un-mute the main microphone to allow the main microphone signal to be transmitted to the far end.

In some instances, due to the nature of the local talker's speech, the DSP 125 may inadvertently switch the state of the main microphone from un-muted to mute. To prevent inadvertent muting, and the resultant choppiness, the DSP 125 can introduce a period of time, say 200 ms, after it un-mutes the main microphone, during which period the DSP 125 will not mute the main microphone even if the comparison in step 312 indicates that local talker is inactive. Furthermore, to make the detection of either the active or inactive state more robust, the DSP 125 may require the result of the comparison step 312 to be the same for at least n number of consecutive frames (e.g., 3 consecutive frames) before determining to mute or un-mute the main microphone signal.

In some instances, the DSP 125 may not be able to detect, or detect too late, the onset of speech by the local talker. For example, some words such as "six" have weak or unvoiced first syllables, and if the speech begins with such words, the DSP 125 may not detect that the local talker is active until after later occurring stronger syllables have been voiced. This means that the far end would receive the local talker's speech with first few syllables missing. One reason the DSP may be unable to detect the weak syllables is because their spectral energy lies in high frequency bands (above 3 KHz), which are typically higher than the range of frequencies considered while determining the sum S(m). Of course, one way to account for these syllables can be to extend the subbands over which the sum S(m) is determined to higher frequencies.

Figure 21:
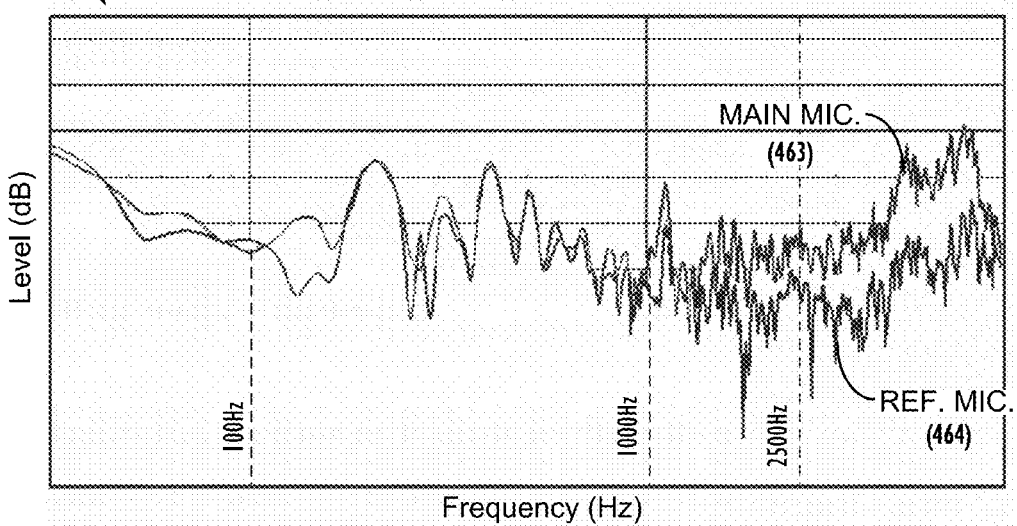
FIG. 21 compares spectral profiles of the main and reference microphone signals in response to an unvoiced or weak syllable to spectral profiles in response to high frequency percussive noise.
Figure 21:
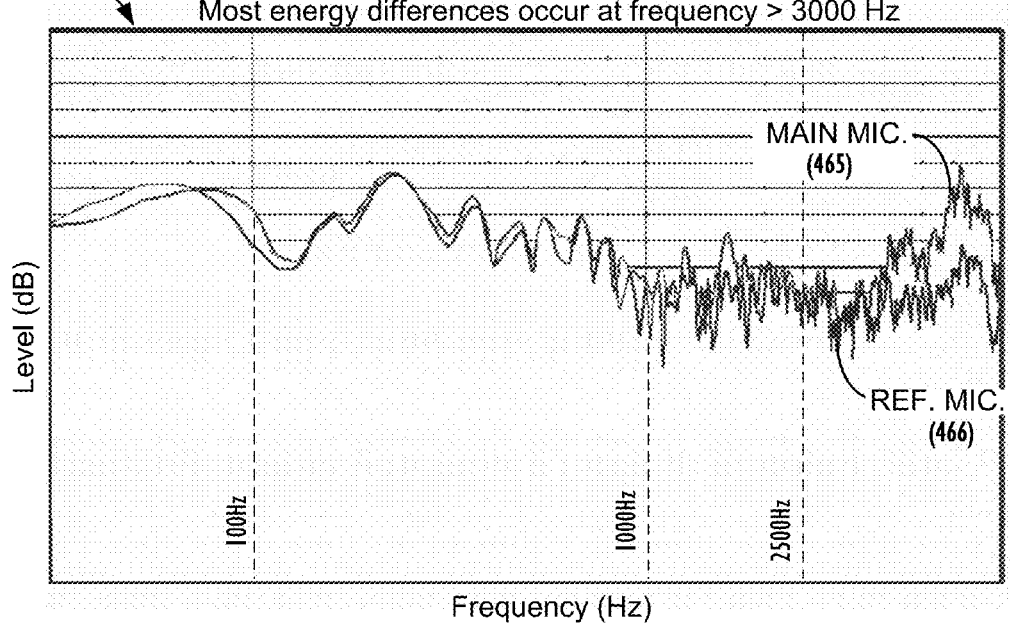

For example, plot 461 of FIG. 21 shows the main microphone spectrum 463 and the reference microphone spectrum 464 in response to the spoken word "six." Appreciable energy difference between the main and reference microphone signal spectrums appear at frequencies greater than 2.5 KHz to 3 KHz. Therefore, including higher frequency bands in the determination of the sum S(m) may help in detecting the onset of weak syllables. However, as shown in plot 462, percussive noise produces main and reference microphone signal spectra similar to the one shown in plot 461. Therefore, by merely including higher frequency bands in the determination of sum S(m) may render the DSP 125 to falsely detect the local talker as active in the presence of percussive noise.

One solution to this problem is to modify the way the sum S(m) is calculated, such that levels of amplitude (or energy, power, etc.) are summed differently in different frequency ranges. Thus, even though the sum S(m) is determined over all available frequency bands, including the higher frequency bands, the contribution of each frequency band to the sum can be different based on the position of the frequency band within the spectrum. In one example, the sum S(m) is calculated as follows:

For the frequency region between 0-3 kHz, the ratios of main and reference microphone levels for each subband are summed to determine S(m).

For the frequency range between 3-4 kHz, the sum of two energy values of the main and reference microphone are divided and summed to determine S(m).

For the frequency range between 4-5.5 kHz, the sum of four energy values of the main and reference microphone are divided and summed to determine S(m).

For the frequency range between 5.5-8 kHz, the sum of eight energy values of the main and reference microphone are divided and summed to determine S(m).

With S(m) calculated as shown above, the DSP 125 can not only detect onset of weak syllables, but also distinguish the weak syllables from high frequency percussive noise.

While the signals produced by the subband analysis filter banks have been shown to be in the frequency domain, it is understood that the signals can also be converted into time domain and the processing carried out in time domain. The conversion from frequency domain to time domain is well known.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A system comprising:
    a main device including a main microphone for generating a main microphone signal;
    a reference device including a reference microphone for generating a reference microphone signal;
    a communication link coupling the main device and the reference device; and
    a processor configured to:
        receive the main microphone signal and the reference microphone signal, and
        generate a noise suppressed main microphone signal by using the reference microphone signal to suppress far field noise in the main microphone signal,
    wherein the main device and the reference device, when not communicating with each other over the communication link, are configured to provide near end audio signals to a far end independently of each other.

2. The system of claim 1, wherein the distance between the main microphone and the reference microphone is variable.

3. The system of claim 1, wherein the processor is further configured to:
    for a consecutive plurality of time frames, split the main microphone signal and the reference microphone signal into a plurality of subbands;
    determine a coupling estimate between the main microphone signal and the reference microphone signal in each of the plurality of subbands;
    determine a reference noise source estimate in the reference microphone signal in each of the plurality of subbands;
    determine a far field noise estimate based on the coupling estimate and the reference noise estimate in each of the plurality of subbands;
    subtract the far field noise estimate from the main microphone signal for each of the plurality of subbands; and
    combine the subtracted main microphone signal in each of the plurality of subbands to form the noise suppressed main microphone signal.

4. The system of claim 3, wherein the coupling estimate is a function of a ratio of magnitudes of the main microphone signal and the reference microphone signal.

5. The system of claim 4, wherein the processor is further configured to update the coupling estimate each time frame based on the ratio and a coupling estimate of an immediately previous time frame.

6. The system of claim 3, wherein the reference noise estimate is a function of a reference noise estimate of an immediately previous time frame and a magnitude of the reference microphone signal of a current time frame, and wherein the reference noise estimate depends more on the reference noise estimate of the immediately previous time frame than on the magnitude of the reference microphone signal when the reference microphone signal includes a signal of interest.

7. The system of claim 3, wherein the main microphone signal and the reference microphone signal have a single frequency domain coefficient in each of the plurality of subbands.

8. The system of claim 1, wherein the processor is located in the main device, and wherein the reference microphone signal is transmitted from the reference device to the main device over the communication link.

9. The system of claim 8, wherein the processor is further configured to delay the main microphone signal to align the main microphone signal with the received reference microphone signal, and wherein the processor is further configured to:
- discontinue suppressing far field noise in the main microphone signal if a latency of the main microphone signal is above a predetermined limit; and
- resume suppressing far field noise in the main microphone signal during a near end monologue.

10. The system of claim 1, wherein the processor is located in the reference device, and wherein the main microphone signal is transmitted from the main device to the reference device over the communication link, and wherein the reference device is further configured to transmit the noise suppressed main microphone signal to a far end communication device.

11. The system of claim 1, wherein to generate the noise suppressed main microphone signal includes:
- comparing the main microphone signal to the reference microphone signal to determine a state of talking of at least one local participant; and
- suppressing the main microphone signal if the state of talking is inactive to generate the noise suppressed main microphone signal.

12. The system of claim 11, wherein suppressing the main microphone signal includes muting the main microphone signal.

13. The system of claim 11, wherein suppressing the main microphone signal includes replacing the main microphone signal with a white noise signal.

14. The system of claim 11, wherein the processor is further configured to allow a transmission of the main microphone signal to a far end if the local participant's state of talking is active.

15. The system of claim 11, wherein the comparing includes comparing the main microphone signal to the reference microphone signal within a plurality of subbands.

16. The system of claim 11, wherein the comparing includes taking a ratio of energies of the main and reference microphone signals within each of the plurality of subbands and sum the ratios, and wherein the state of talking of at least one local participant is determined to be inactive when the sum of the ratios is less than a predetermined threshold.

17. The system of claim 16, wherein the ratios are summed differently for subbands in a first frequency range from those for subbands in a second frequency range.

18. A method comprising:
- receiving a main microphone signal generated by a main microphone;
- receiving a reference microphone signal generated by a reference microphone; and
- generating a noise suppressed main microphone signal by using the reference microphone signal to suppress far field noise in the main microphone signal,
- wherein the main microphone and the reference microphone are located on a main device and a reference device respectively, and wherein the main device and the reference device are separate devices and configured to communicate with each other over a communication link, and
- wherein the main device and the reference device, when not communicating with each other over the communication link, are configured to provide near end audio signals to a far end independently of each other.

19. The method of claim 18, wherein the distance between the main microphone and the reference microphone is variable.

20. The method of claim 18, wherein the generating the noise suppressed main microphone signal includes:
- for a consecutive plurality of time frames, splitting the main microphone signal and the reference microphone signal into a plurality of subbands;
- determining a coupling estimate between the main microphone signal and the reference microphone signal in each of the plurality of subbands;
- determining a reference noise source estimate in the reference microphone signal in each of the plurality of subbands;
- determining a far field noise estimate based on the coupling estimate and the reference noise estimate in each of the plurality of subbands;
- subtracting the far field noise estimate from the main microphone signal for each of the plurality of subbands; and
- combining the subtracted main microphone signal in each of the plurality of subbands to form the noise suppressed main microphone signal.

21. The method of claim 20, wherein the coupling estimate is a function of a ratio of magnitudes of the main microphone signal and the reference microphone signal.

22. The method of claim 21, further comprising updating the coupling estimate each time frame based on the ratio and a coupling estimate of an immediately previous time frame.

23. The method of 20, wherein the reference noise estimate is a function of a reference noise estimate of an immediately previous time frame and a magnitude of the reference microphone signal of a current time frame, and wherein the reference noise estimate depends more on the reference noise estimate of the immediately previous time frame than on the magnitude of the reference microphone signal when the reference microphone signal includes a signal of interest.

24. The method of claim 20, wherein the main microphone signal and the reference microphone signal have a single frequency domain coefficient in each of the plurality of subbands.

25. The method of claim 18, wherein the receiving the reference microphone signal includes receiving the reference microphone signal at the main device from the reference device over the communication link, and wherein the act of generating is carried out at the main device.

26. The method of claim 25, further comprising:
- delaying the main microphone signal to align with the main microphone signal with the received reference microphone signal before the act of generating the noise suppressed main microphone signal,
- discontinuing the act of generating the noise suppressed main microphone signal if a latency of the main microphone signal is above a predetermined threshold; and
- resuming the act of generating the noise suppressed main microphone signal during a near end monologue.

27. The method of claim 18, wherein the receiving the main microphone signal includes receiving the main microphone signal at the reference device from the main device over the communication link, and wherein the act of generating the noise suppressed main microphone signal is carried out at the reference device.

28. The method of claim 18, wherein generating the noise suppressed main microphone signal includes:
- comparing the main microphone signal to the reference microphone signal to determine a state of talking of at least one local participant; and suppressing the main microphone signal if the state of talking is inactive to generate the noise suppressed main microphone signal.

29. The method of claim 28, wherein suppressing the main microphone signal includes muting the main microphone signal.

30. The method of claim 28, wherein suppressing the main microphone signal includes replacing the main microphone signal with a white noise signal.

31. The method of claim 28, further comprising transmitting the main microphone signal to a far end if the local participant's state of talking is active.

32. The method of claim 28, wherein the act of comparing includes comparing the main microphone signal and the reference microphone signal within a plurality of subbands.

33. The method of claim 32, wherein the act of comparing further includes taking a ratio of energies of the main and reference microphone signals within each of the plurality of subbands and summing the ratios, wherein the state of talking of at least one local participant is determined to be inactive when the sum of the ratios is less than a predetermined threshold.

34. The method of claim 33, wherein the ratios are summed differently for subbands in a first frequency range from those for subbands in a second frequency range.

\* \* \* \* \*